United States Patent
Kurarta et al.

(10) Patent No.: US 8,565,679 B2
(45) Date of Patent: Oct. 22, 2013

(54) COMMUNICATION SYSTEM, INFORMATION PROCESSING APPARATUS, COMPUTER-READABLE STORAGE MEDIUM HAVING PROGRAM STORED THEREIN, AND INFORMATION PROCESSING METHOD

(75) Inventors: Megumi Kurarta, Kyoto (JP); Ryoma Aoki, Kyoto (JP); Manabu Okajima, Kyoto (JP); Tetsuya Nakata, Kyoto (JP); Kosuke Yabuki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 260 days.

(21) Appl. No.: 13/159,822

(22) Filed: Jun. 14, 2011

(65) Prior Publication Data

US 2012/0220230 A1    Aug. 30, 2012

(30) Foreign Application Priority Data

Feb. 25, 2011   (JP) .................................. 2011-040945

(51) Int. Cl.
*H04B 7/00*   (2006.01)

(52) U.S. Cl.
USPC .... 455/41.2; 455/435.1; 455/566; 455/67.13; 455/556.1; 455/557; 455/414.1; 709/224; 709/207; 714/49; 714/18; 705/23

(58) Field of Classification Search
USPC ........ 455/41.2, 566, 67.13, 556.1, 557, 414.1
See application file for complete search history.

(56) References Cited

U.S. PATENT DOCUMENTS

| | | | |
|---|---|---|---|
| 7,645,195 B2 * | 1/2010 | Hirota | 463/42 |
| 8,142,283 B2 * | 3/2012 | Lutnick et al. | 463/29 |
| 8,213,866 B2 * | 7/2012 | Shimomura | 455/41.3 |
| 8,353,773 B2 * | 1/2013 | Sasaki et al. | 463/42 |
| 8,384,770 B2 * | 2/2013 | Konno et al. | 348/51 |
| 8,385,971 B2 * | 2/2013 | Rhoads et al. | 455/556.1 |
| 8,433,375 B2 * | 4/2013 | Yamazaki et al. | 455/574 |
| 8,438,294 B2 * | 5/2013 | Lampell et al. | 709/228 |
| 8,454,435 B2 * | 6/2013 | Tsugihashi et al. | 463/30 |

FOREIGN PATENT DOCUMENTS

JP    2006-334386    12/2006

* cited by examiner

*Primary Examiner* — Marceau Milord
(74) *Attorney, Agent, or Firm* — Nixon & Vanderhye, P.C.

(57) ABSTRACT

Provided is a communication system which includes a plurality of game apparatuses. Each game apparatus performs short-range wireless communication with another game apparatus among the plurality of game apparatuses. Through the short-range wireless communication, the game apparatus receives identification information of the other game apparatus (other-apparatus identification information) from the other game apparatus. The game apparatus detects the communication status of the short-range wireless communication with the other game apparatus. Based on the detection result, the game apparatus determines whether or not to register the other game apparatus which is associated with the received other-apparatus identification information. When determining to register the other game apparatus, the information processing apparatus registers the other game apparatus and performs communication with the registered other game apparatus.

21 Claims, 23 Drawing Sheets

F I G. 1
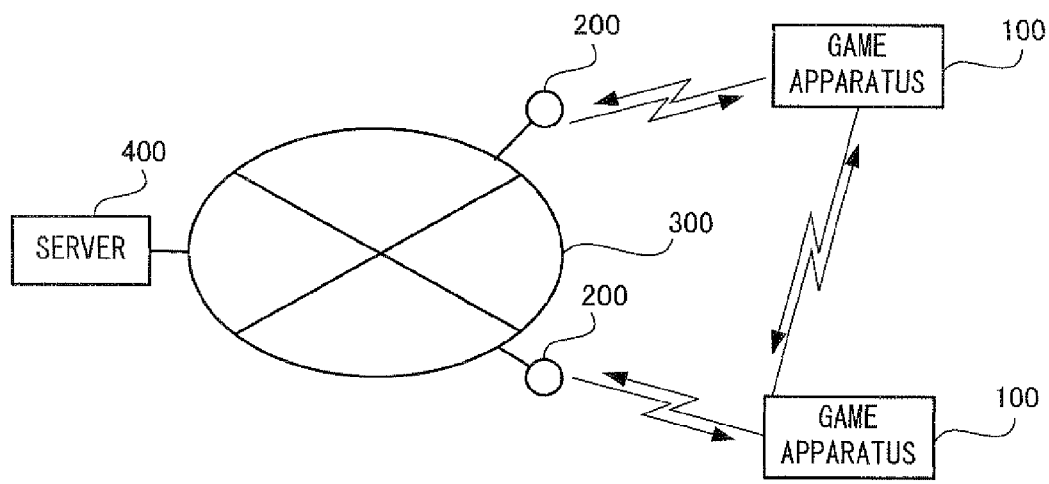

F I G. 4
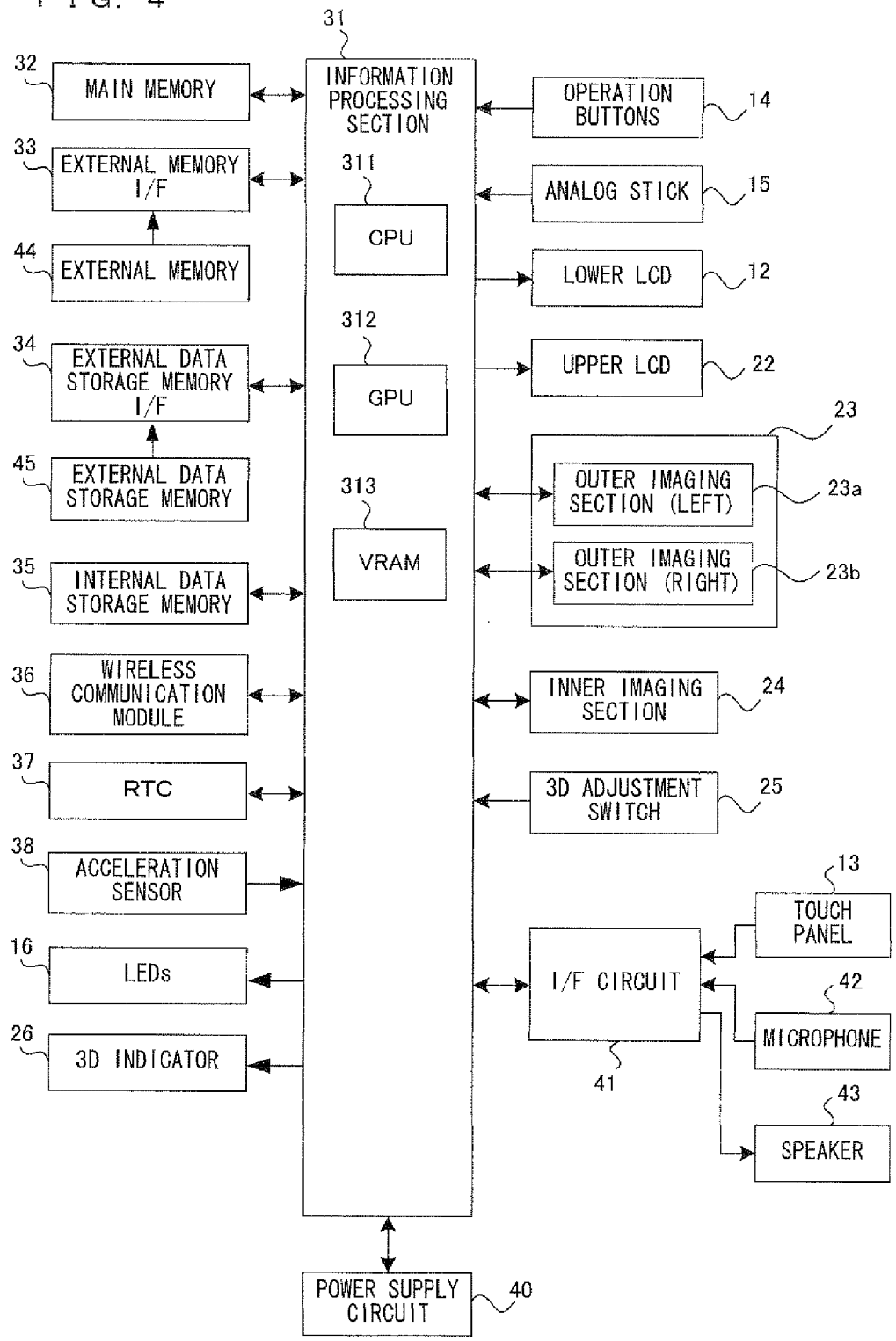

F I G. 1 0 A

| APPARATUS ID (FRIEND ID) | FRIEND NAME | FRIEND CODE | FAVORITE APP ID | CURRENTLY RUNNING APP ID | CHARACTER INFORMATION | MESSAGE | CONNECTION STATUS INFORMATION |
|---|---|---|---|---|---|---|---|
| APPARATUS ID_A | FRIEND NAME A | FRIEND CODE A | APP ID_A | APP ID_a | CHARACTER INFORMATION A | MESSAGE A | ONLINE |
| APPARATUS ID_B | FRIEND NAME B | FRIEND CODE B | APP ID_B | APP ID_b | CHARACTER INFORMATION B | MESSAGE B | OFFLINE |
| APPARATUS ID_C | FRIEND NAME C | FRIEND CODE C | APP ID_C | APP ID_c | CHARACTER INFORMATION C | MESSAGE C | OFFLINE |

F I G. 1 0 B

| APPARATUS ID (FRIEND ID) | FRIEND NAME | FRIEND CODE | CHARACTER INFORMATION |
|---|---|---|---|
| APPARATUS ID_A | FRIEND NAME A | FRIEND CODE A | CHARACTER INFORMATION A |
| APPARATUS ID_D | FRIEND NAME D | FRIEND CODE D | CHARACTER INFORMATION D |

F I G. 1 0 C

| SIGNAL MAGNITUDE dBm | COMMUNICATION LEVEL |
|---|---|
| s1 < SIGNAL MAGNITUDE ≦ s2 | COMMUNICATION LEVEL L1 |
| s2 < SIGNAL MAGNITUDE ≦ s3 | COMMUNICATION LEVEL L2 |
| s3 < SIGNAL MAGNITUDE ≦ s4 | COMMUNICATION LEVEL L3 |
| s4 < SIGNAL MAGNITUDE | COMMUNICATION LEVEL L4 |

F I G. 1 1

| APPARATUS ID | USER NAME | FRIEND CODE | FAVORITE APP ID | CURRENTLY RUNNING APP ID | CHARACTER INFORMATION | MESSAGE | CONNECTION STATUS INFORMATION | LOGIN DETERMINATION FLAG | FRIEND ID |
|---|---|---|---|---|---|---|---|---|---|
| APPARATUS ID_A | USER NAME A | FRIEND CODE A | APP ID_A | APP ID_a | CHARACTER INFORMATION A | MESSAGE A | ONLINE | OFF | APPARATUS ID_B, ⋯ |
| APPARATUS ID_B | USER NAME B | FRIEND CODE B | APP ID_B | APP ID_b | CHARACTER INFORMATION B | MESSAGE B | OFFLINE | ON | APPARATUS ID_A, ⋯ |
| APPARATUS ID_C | USER NAME C | FRIEND CODE C | APP ID_C | APP ID_c | CHARACTER INFORMATION C | MESSAGE C | OFFLINE | ON | APPARATUS ID_A, ⋯ |
| APPARATUS ID_D | USER NAME D | FRIEND CODE D | APP ID_D | APP ID_d | CHARACTER INFORMATION D | MESSAGE D | ONLINE | ON | APPARATUS ID_F, ⋯ |
| APPARATUS ID_E | USER NAME E | FRIEND CODE E | APP ID_E | APP ID_e | CHARACTER INFORMATION E | MESSAGE E | ONLINE | OFF | APPARATUS ID_A, ⋯ |
| APPARATUS ID_F | USER NAME F | FRIEND CODE F | APP ID_F | APP ID_f | CHARACTER INFORMATION F | MESSAGE F | ONLINE | OFF | APPARATUS ID_D, ⋯ |
| APPARATUS ID_G | USER NAME G | FRIEND CODE G | APP ID_G | APP ID_g | CHARACTER INFORMATION G | MESSAGE G | OFFLINE | ON | APPARATUS ID_D, ⋯ |
| APPARATUS ID_H | USER NAME H | FRIEND CODE H | APP ID_H | APP ID_h | CHARACTER INFORMATION H | MESSAGE H | OFFLINE | ON | APPARATUS ID_D, ⋯ |
| APPARATUS ID_I | USER NAME I | FRIEND CODE I | APP ID_I | APP ID_i | CHARACTER INFORMATION I | MESSAGE I | ONLINE | ON | APPARATUS ID_A, ⋯ |
| ⋯ | | | | | | | | | |

COMMUNICATION SYSTEM, INFORMATION PROCESSING APPARATUS, COMPUTER-READABLE STORAGE MEDIUM HAVING PROGRAM STORED THEREIN, AND INFORMATION PROCESSING METHOD

CROSS REFERENCE TO RELATED APPLICATION

The disclosure of Japanese Patent Application No. 2011-040945, filed on Feb. 25, 2011, is incorporated herein by reference.

BACKGROUND OF THE INVENTION

1. Field of the Invention

The present invention relates to a communication system, an information processing apparatus, a computer-readable storage medium having a program stored therein, and an information processing method. More particularly, the present invention relates to a communication system, an information processing apparatus, a computer-readable storage medium having a program stored therein, and an information processing method, which allow a plurality of information processing apparatuses to register each other as communication partners and allow the information processing apparatuses having registered each other as communication partners to perform communication with each other.

2. Description of the Background Art

There are known conventional communication systems in which a plurality of information processing apparatuses register each other as friends (friend registration) and the information processing apparatuses having registered each other as friends communicate with each other. For example, Japanese Laid-Open Patent Publication No. 2006-334386 discloses a network game system. In the network game system, when a plurality of game apparatuses play a network game among them, first, each game apparatus registers therein, as a friend, a partner game apparatus to play a network game with, for the purpose of preventing the following situation from arising: a connection of an unknown game apparatus to the game apparatus is unilaterally established by the unknown game apparatus. Then, an online game is performed only among the game apparatuses that have registered each other as friends. In the network game system disclosed in Japanese Laid-Open Patent Publication No. 2006-334386, a plurality of game apparatuses that wish to register each other as friends perform short-range wireless communication among them before they play an online game. Through the short-range wireless communication, each of the game apparatuses obtains identification information (an apparatus ID) of its partner game apparatus and registers the obtained apparatus ID as a friend.

However, in the online game system disclosed in Japanese Laid-Open Patent Publication No. 2006-334386, there is a possibility that if game apparatuses that are different from those intended by a user to be registered as friends are located within a communicable distance from the user's game apparatus for short-range wireless communication, then such a game apparatus is erroneously registered as a friend of the user's game apparatus.

SUMMARY OF THE INVENTION

Therefore, an object of the present invention is to provide a communication system, an information processing apparatus, a computer-readable storage medium having a program stored therein, and an information processing method, which allow, in a case where an information processing apparatus performs short-range wireless communication in order to register another information processing apparatus as a communication partner, the information processing apparatus to accurately register a desired information processing apparatus as a communication partner.

In order to achieve the object mentioned above, a first aspect of the present invention is directed to a communication system including a plurality of information processing apparatuses. Each information processing apparatus includes: first communication means, receiving means, communication status detection means, registration/non-registration determination means, and first registration means. The first communication means performs short-range wireless communication with another information processing apparatus among the plurality of information processing apparatuses. The receiving means receives, by using the first communication means, other-apparatus identification information which is identification information of the other information processing apparatus, from the other information processing apparatus. The communication status detection means detects, by using the first communication means, a communication status of the short-range wireless communication with the other information processing apparatus. The registration/non-registration determination means determines, based on a result of the detection by the communication status detection means, whether or not to register the other information processing apparatus which is associated with the other-apparatus identification information received by the receiving means. The first registration means registers the other information processing apparatus when the registration/non-registration determination means has determined to register the other information processing apparatus. In the communication system, each information processing apparatus performs communication with the other information processing apparatus based on the registration by the first registration means.

According to the above configuration, each information processing apparatus can determine and register another information processing apparatus as a communication partner, based on the detected communication status of the short-range wireless communication with the other information processing apparatus. Accordingly, for example, the information processing apparatus may register another information processing apparatus as a communication partner only when the detection result of the communication status indicates that the other information processing apparatus is an apparatus that the user of the information processing apparatus wishes to register as a communication partner. This effectively prevents another information processing apparatus that the user does not wish to register as a communication partner from being erroneously registered as a communication partner. This makes it possible to register other information processing apparatuses as desired by the user, with reduced erroneous registrations. This effectively prevents the following situation from arising: the user of the information processing apparatus erroneously registers, as a communication partner, another information processing apparatus that the user does not wish to register. It should be noted that the information processing apparatus may perform communication with another information processing apparatus that is not registered by the first registration means. Moreover, the information processing apparatus may perform communication with another information processing apparatus registered by the first registration means, either via a network or by means of short-range wireless communication.

In the communication system according to a second aspect of the present invention, the communication status may include a signal magnitude of a signal that is received by the first communication means from the other information processing apparatus. According to this configuration, the following situation can be effectively prevented from arising: when there is another information processing apparatus that the user of the information processing apparatus does not wish to register since the other information processing apparatus is, for example, located at a far distance from the information processing apparatus and the signal magnitude of a signal received from the other information processing apparatus is less than a predetermined value, the other information processing apparatus is erroneously registered as a communication partner.

In the communication system according to a third aspect of the present invention, the registration/non-registration determination means may determine the other information processing apparatus to be a registration target if the communication status with the other information processing apparatus, which is detected by the communication status detection means, indicates that the signal magnitude exceeds a second threshold. According to this configuration, if the signal magnitude of a signal received from the other information processing apparatus is less than or equal to the second threshold, then it is determined that the other information processing apparatus is not an apparatus that the user of the information processing apparatus wishes to register. This makes it possible to prevent the other information processing apparatus from being registered as a communication partner.

It is understood that the signal magnitude increases in accordance with a decrease in the distance between the information processing apparatus and the other information processing apparatus. Here, if the information processing apparatus is performing a process for registering the other information processing apparatus as a communication partner, it is likely that the information processing apparatus and the other information processing apparatus are in relatively close proximity to each other, because, in a usual situation, the user of the information processing apparatus and the user of the other information processing apparatus would be in such relatively close proximity to each other (for example, be next to each other or face each other) when the user operates the information processing apparatus in order to register the other information processing apparatus as a communication partner. Accordingly, if the signal magnitude is less than the second threshold, it is likely that the information processing apparatus and the other information processing apparatus are not in such relatively close proximity to each other, and that the other information processing apparatus is not an apparatus that the user of the information processing apparatus wishes to register as a communication partner. According to the above configuration, erroneous registration of such an undesired information processing apparatus as a communication partner can be effectively prevented.

In the communication system according to a fourth aspect of the present invention, the second threshold may be a value greater than a first threshold, and the short-range wireless communication using the first communication means is performable between the information processing apparatus and the other information processing apparatus when the signal magnitude exceeds the first threshold. The second threshold is used for determining whether the other information processing apparatus is located close enough to the information processing apparatus so that the other information processing apparatus can be determined to be a registration target. Therefore, the second threshold is set to a value greater than the first threshold which allows the short-range wireless communication using the first communication means to be performed between the information processing apparatus and the other information processing apparatus.

In the communication system according to a fifth aspect of the present invention, a communication module for the first communication means may obtain, from the other information processing apparatus, data of which signal magnitude exceeds the first threshold, and the registration/non-registration determination means may determine the other information processing apparatus to be a registration target if the signal magnitude of the data obtained by the communication module exceeds the second threshold which is greater than a predetermined level. According to this configuration, the communication module of the information processing apparatus obtains pieces of data of which signal magnitude is at a level that allows communication using the first communication means to be performed. Among other information processing apparatuses that are the sources of the respective pieces of data, one other information processing apparatus that is the source of data of which signal magnitude is at a level that allows the one other information processing apparatus to be determined as a registration target, is determined as a registration target.

In the communication system according to a sixth aspect of the present invention, each information processing apparatus may further include information processing execution means for performing, by using the first communication means, communication with the other information processing apparatus for predetermined information processing. The information processing execution means may execute the predetermined information processing by using data which is received from the other information processing apparatus and of which signal magnitude is at a predetermined level or greater. The registration/non-registration determination means may determine the other information processing apparatus to be a registration target if the signal magnitude exceeds the second threshold which is greater than a predetermined level. According to this configuration, the execution of the predetermined information processing uses data which is received from the other information processing apparatus and of which signal magnitude is at a predetermined level or greater, and in order to register the other information processing apparatus as a communication partner, the signal magnitude needs to exceed the second threshold which is greater than the predetermined level.

In the communication system according to a seventh aspect of the present invention, each information processing apparatus further includes application execution means for executing a predetermined application. Through execution of the application, the receiving means may obtain application processing data from the other information processing apparatus by using the first communication means. The first communication means may perform a communication process using the application processing data if the communication status detected by the communication status detection means indicates that the signal magnitude exceeds a first threshold.

In the communication system according to an eighth aspect of the present invention, the communication status includes one of multiple communication levels which are defined in relation to the signal magnitude. According to this configuration, the signal magnitude can be determined by using the multiple communication levels. This makes it possible to simplify the manner of determining information that is a processing target. This reduces a processing load. The communication levels are used to grade how well the communication status is. The communication levels may be determined in relation solely to the signal magnitude, or may be determined in relation to the signal magnitude as well as other factors.

In the communication system according to a ninth aspect of the present invention, the receiving means may be configured to receive a plurality of pieces of other-apparatus identification information from other respective information processing apparatuses among the plurality of information processing apparatuses. The registration/non-registration determination means may determine, based on communication statuses which the communication status detection means detects between the information processing apparatus and the other respective information processing apparatuses, whether or not to register the other information processing apparatuses which are associated with the respective pieces of other-apparatus identification information. According to this configuration, if a plurality of pieces of other-apparatus identification information are obtained from other information processing apparatuses among the plurality of information processing apparatuses, whether or not to register the other information processing apparatuses are determined based on their respective communication statuses. In this manner, registration/non-registration can be determined for multiple apparatuses at one time.

In the communication system according to a tenth aspect of the present invention, each information processing apparatus may further include input means for receiving a selection from a user, and the registration/non-registration determination means determines to register, among the other information processing apparatuses associated with the respective pieces of other-apparatus identification information, one other information processing apparatus of which the communication status satisfies a predetermined condition and which is specified by the selection received by the input means. According to this configuration, the user of each information processing apparatus selects another information processing apparatus and only the selected information processing apparatus is registered as a communication partner. In this manner, another information processing apparatus that the user wishes to register as a friend can be registered as a communication partner more accurately.

In the communication system according to an eleventh aspect of the present invention, each information processing apparatus further includes display means. The display means displays associated information which is associated with, among the other information processing apparatuses, information processing apparatuses of which the communication status satisfies the predetermined condition. The registration/non-registration determination means determines to register, among the information processing apparatuses of which the associated information is displayed, an information processing apparatus that is specified by the selection received by the input means. According to this configuration, since the associated information is displayed, the user of the information processing apparatus can select, by using the associated information as a clue, another information processing apparatus that the user wishes to register in the information processing apparatus as a communication partner. In this manner, the other information processing apparatus which the user wishes to register as a communication partner can be registered as a communication partner more accurately.

In the communication system according to a twelfth aspect of the present invention, the receiving means may use the first communication means to receive, in addition to the other-apparatus identification information, user information which indicates characteristics of users of the other respective information processing apparatuses. According to this configuration, user information can be received from the other information processing apparatus by means of the short-range wireless communication, and the user information can be used when the registration/non-registration determination means determines whether or not to register the other information processing apparatus.

In the communication system according to a thirteenth aspect of the present invention, the display means may display, as the associated information, the user information that is associated with, among the other information processing apparatuses, information processing apparatuses of which the communication status satisfies the predetermined condition. According to this configuration, the user of the information processing apparatus can select, by using the displayed user information as a clue, another information processing apparatus that the user wishes to register in the information processing apparatus as a communication partner. In this manner, the other information processing apparatus which the user wishes to register as a communication partner can be registered more accurately.

In the communication system according to a fourteenth aspect of the present invention, the receiving means receives, as the user information, character information associated with the users of the other respective information processing apparatuses. According to this configuration, the user of the information processing apparatus can select, by using the received character information as a clue, another information processing apparatus that the user wishes to register in the information processing apparatus as a communication partner. For example, if a character resembling the user of another information processing apparatus is displayed, the user of the information processing apparatus can select, by using the character as a clue, the other information processing apparatus which is associated with the character. In this manner, the other information processing apparatus which the user wishes to register as a communication partner can be registered as a communication partner more accurately.

In the communication system according to a fifteenth aspect of the present invention, the registration/non-registration determination means determines to register the one other information processing apparatus if: the registration/non-registration determination means has used, when the user has selected the one other information processing apparatus by using the input means, the first communication means to transmit to the one other information processing apparatus a selection notification that notifies the one other information processing apparatus about the selection; and the first communication means has received from the one other information processing apparatus a selection notification that notifies the information processing apparatus that the information processing apparatus has been selected at the one other information processing apparatus's end. According to this configuration, another information processing apparatus is registered as a communication partner of the information processing apparatus only when the other information processing apparatus also registers the information processing apparatus as a communication partner of the other information processing apparatus. Thus, according to this configuration, the information processing apparatus can register the other information processing apparatus as a communication partner of the information processing apparatus only when the other information processing apparatus registers the information processing apparatus as a communication partner of the other information processing apparatus. In this manner, the registration is performed by mutual agreement. This prevents the information processing apparatus from being registered in another information processing apparatus against the will of the user of the information processing apparatus.

In the communication system according to a sixteenth aspect of the present invention, the receiving means performs a receiving process for receiving the other-apparatus identification information, and when a predetermined period has elapsed after the receiving process is started or when a predetermined number of pieces of other-apparatus identification information have been received, ends the receiving process. If the receiving process is performed unlimitedly, this may result in registering, as a communication partner, another information processing apparatus that the user of the information processing apparatus does not wish to register, or this may result in unavailability of other communication processes due to the continuous use of the communication module for the receiving process. However, according to the above configuration, the receiving process ends when a predetermined period has elapsed since the start of the receiving process even if other-apparatus identification information cannot be received from any information processing apparatus, or when a predetermined number of pieces of other-apparatus identification information have been obtained. This prevents the inconvenience as described above from occurring.

In the communication system according to a seventeenth aspect of the present invention, each information processing apparatus further includes transmission means. The transmission means may broadcast, by using the first communication means, request information for requesting to transmit the other-apparatus identification information. When the receiving means has received, by using the first communication means, response information which the other information processing apparatus transmits in response to the request information, the receiving means may obtain from the response information the other-apparatus identification information which is associated with the other information processing apparatus. According to this configuration, the other-apparatus identification information is obtained only when the short-range wireless communication is performable between the information processing apparatus and the other information processing apparatus in a reciprocal manner. Thus, the information processing apparatus can register the other information processing apparatus as a communication partner of the information processing apparatus only when the other information processing apparatus registers the information processing apparatus as a communication partner of the other information processing apparatus.

In an eighteenth aspect of the present invention, the communication system may further include a server. The server may include server communication means, second registration means, and update means. The server communication means may perform communication with the plurality of information processing apparatuses. The second registration means may store, for each information processing apparatus, registration information indicating the other information processing apparatus which the information processing apparatus has registered by using the first registration means, such that the registration information is associated with the information processing apparatus. The update means may update, when the server communication means has received the registration information from any of the information processing apparatuses, information stored in the second registration means by using the received registration information. Each information processing apparatus may use second communication means to transmit, to the server, the registration information which the information processing apparatus has registered by using the first registration means and which indicates the other information processing apparatus. According to this configuration, the server stores and updates as necessary, for each information processing apparatus, the other information processing apparatus which the information processing apparatus registers as its communication partner. This allows the information processing apparatus to obtain, from the server, particular information about the other information processing apparatus which is registered as a communication partner of the information processing apparatus (for example, information about the communication connection status of the other information processing apparatus).

A nineteenth aspect of the present invention is directed to an information processing apparatus including first communication means, receiving means, communication status detection means, registration/non-registration determination means, and first registration means. The first communication means performs short-range wireless communication with another information processing apparatus among the plurality of information processing apparatuses. The receiving means receives, by using the first communication means, other-apparatus identification information which is identification information of the other information processing apparatus, from the other information processing apparatus. The communication status detection means detects, by using the first communication means, a communication status of the short-range wireless communication with the other information processing apparatus. The registration/non-registration determination means determines, based on a result of the detection by the communication status detection means, whether or not to register the other information processing apparatus which is associated with the other-apparatus identification information received by the receiving means. The first registration means registers the other information processing apparatus when the registration/non-registration determination means has determined to register the other information processing apparatus. The information processing apparatus performs communication with the other information processing apparatus which is registered by the first registration means.

A twentieth aspect of the present invention is directed to a computer-readable storage medium having stored therein a program. The program may cause a computer of an information processing apparatus to act as first communication means, receiving means, communication status detection means, registration/non-registration determination means, and first registration means. The first communication means performs short-range wireless communication with another information processing apparatus among the plurality of information processing apparatuses. The receiving means receives, by using the first communication means, other-apparatus identification information which is identification information of the other information processing apparatus, from the other information processing apparatus. The communication status detection means detects, by using the first communication means, a communication status of the short-range wireless communication with the other information processing apparatus. The registration/non-registration determination means determines, based on a result of the detection by the communication status detection means, whether or not to register the other information processing apparatus which is associated with the other-apparatus identification information received by the receiving means. The first registration means registers the other information processing apparatus when the registration/non-registration determination means has determined to register the other information processing apparatus. The program causes the computer of the information processing apparatus to perform communication with the other information processing apparatus which is registered by the first registration means.

A twenty-first aspect of the present invention is directed to an information processing method using an information processing apparatus which includes first communication means for performing short-range wireless communication with another information processing apparatus. The information processing method includes a receiving step, a communication status detection step, a registration/non-registration determination step, a registration step, and a communication step. The receiving step is a step of receiving, by performing the short-range wireless communication using the first communication means, other-apparatus identification information which is identification information of the other information processing apparatus, from the other information processing apparatus. The communication status detection step is a step of detecting a communication status of the short-range wireless communication with the other information processing apparatus. The registration/non-registration determination step is a step of determining, based on a result of the detection in the communication status detection step, whether or not to register the other information processing apparatus which is associated with the other-apparatus identification information received in the receiving step. The registration step is a step of registering the other information processing apparatus when it is determined in the registration/non-registration determination step to register the other information processing apparatus. The communication step is a step of performing communication with the other information processing apparatus which is registered in the first registration step. The above nineteenth to twenty-first aspects provide the same functions and effects as those provided by the first aspect.

According to the present invention, each information processing apparatus can determine and register another information processing apparatus as a communication partner, based on the detected communication status of the short-range wireless communication with the other information processing apparatus. Accordingly, the information processing apparatus may register another information processing apparatus as a communication partner only when the detected communication status is such a favorable status that the user of the information processing apparatus wishes to register the other information processing apparatus as a communication partner. This effectively prevents another information processing apparatus that the user does not wish to register as a communication partner from being erroneously registered as a communication partner. This makes it possible to provide a communication system, an information processing apparatus, a computer-readable storage medium having a program stored therein, and an information processing method for registering other information processing apparatuses as desired by the user of the information processing apparatus, with reduced erroneous registrations. For example, the information processing apparatus may register another information processing apparatus as a communication partner only when the detected communication status indicates that the other information processing apparatus is located at a relatively close distance from the information processing apparatus. In this manner, only information processing apparatuses that are located at relatively close distances from the information processing apparatus can be specified as registration targets. In this case, it is likely that information processing apparatuses that are different from those located at relatively close distances from the information processing apparatus are apparatuses that the user of the information processing apparatus does not wish to register as communication partners. Thus, according to the present invention, erroneous registration of such an undesired information processing apparatus as a communication partner can be effectively prevented.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 shows a communication system according to one embodiment of the present invention;

FIG. 4 is a block diagram showing an internal configuration of the game apparatus;

FIG. 6 shows an example of screens that show a communication connection status of friend game apparatuses, friend information about the friend game apparatuses, and the like;

FIG. 10A shows an example of a friend list table D2;

FIG. 10B shows an example of a friend candidate list table D3;

FIG. 10C shows an example of a communication level table D4;

FIG. 11 shows an example of a management table D10;

DESCRIPTION OF THE PREFERRED EMBODIMENTS

Figure 2:
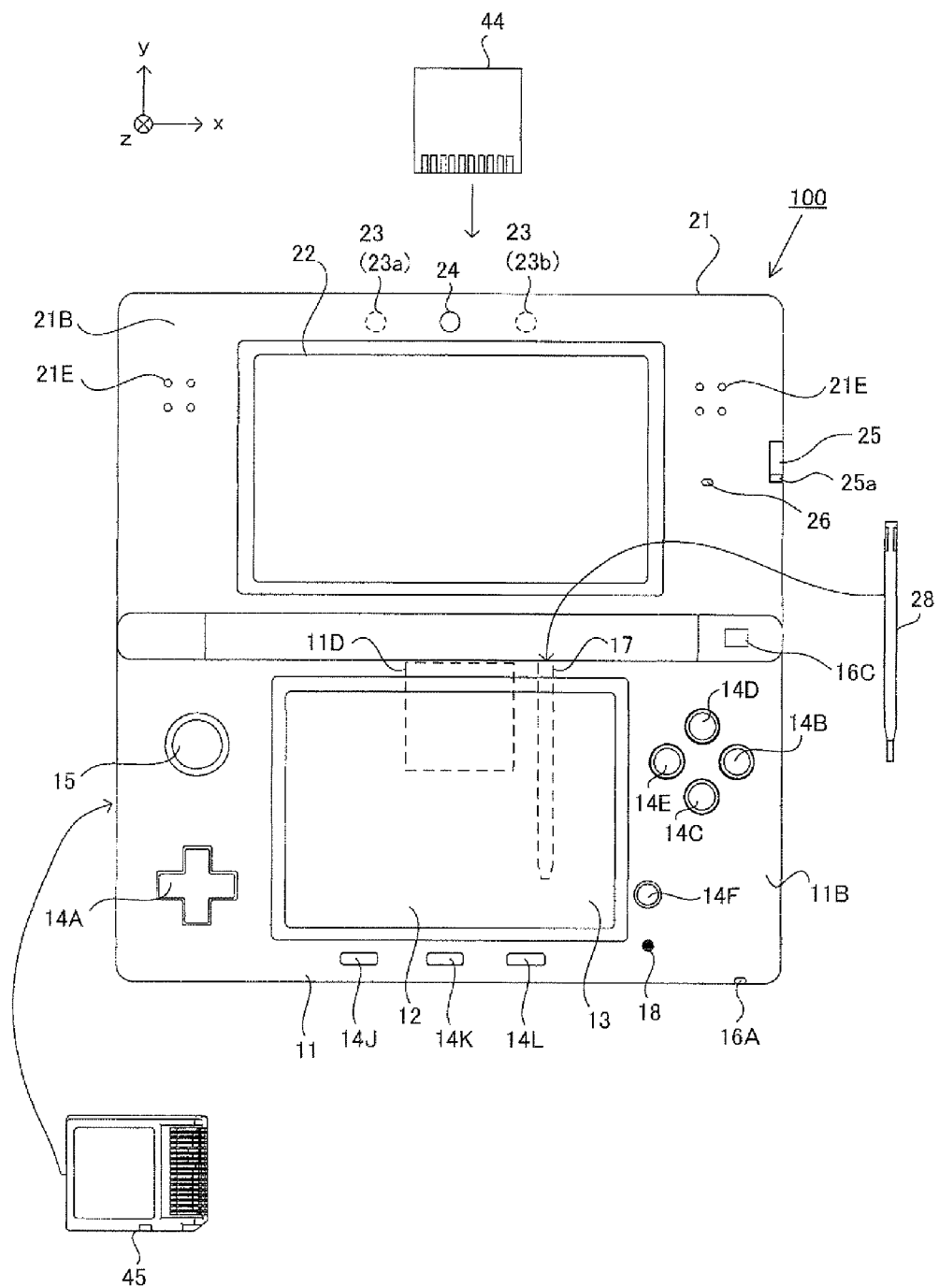
FIG. 2 is a front view of a game apparatus in an opened state.

Hereinafter, a communication system according to an embodiment of the present invention is described with reference to FIG. 1. FIG. 1 shows the communication system according to the embodiment of the present invention. In FIG. 1, a communication system 1 includes a plurality of game apparatuses 100 (which are an example of a plurality of information processing apparatuses of the present invention) and a server 400 which is communicably connected to the game apparatuses 100 via access points 200 and a network 300.

The game apparatuses 100 are handheld apparatuses which the users can carry around. Each game apparatus 100 has wireless communication functions. When the game apparatus 100 is located within such a distance range, from an access point 200, that allows the game apparatus 100 to communicate with the access point 200 (hereinafter, referred to as a communicable range) and is communicably connected to the access point 200, the game apparatus 100 communicates via the access point 200 with another communication apparatus (e.g., the server 400) connected to the network 300.

The plurality of game apparatuses 100, only when they register each other as communication partners (hereinafter, "register as friends" or "friend registration"), perform predetermined communication with each other via the access points 200 and the network 300 (for example, communication for a network game). It should be noted that the plurality of game apparatuses 100 may communicate with each other via the server 400 or without involving the server 400.

Each game apparatus 100 performs short-range wireless communication with another game apparatus 100 that is located within a predetermined distance from the game apparatus 100 (e.g., 10 m to 30 m), by means of a predetermined communication protocol. In the case of performing the short-range wireless communication, the game apparatuses 100 directly communicate with each other without involving the access points 200 or the network 300. In the present embodiment, by means of the short-range wireless communication, the game apparatuses 100 exchange information indicating their own apparatus IDs for the purpose of friend registration where each game apparatus 100 registers, as a friend, another game apparatus 100 that acts a communication partner. Each game apparatus 100 has an apparatus ID which is identification information unique thereto. Examples of the apparatus ID include a MAC (Media Access Control) address and information generated based on a MAC address. Each game apparatus 100 registers a received apparatus ID as a friend (hereinafter, there are cases where a game apparatus 100 registered as a friend is referred to as a "friend game apparatus 100", and there are cases where the user of a friend game apparatus 100 is referred to as a "friend user").

Although FIG. 1 shows two game apparatuses 100, the number of game apparatuses 100 is not limited to two. The number of game apparatuses 100 may be more than two.

The server 400 stores and manages, for each game apparatus 100, game apparatuses 100 that the game apparatus 100 registers as friends. Specifically, each game apparatus 100 transmits the apparatus IDs of game apparatuses 100 that the game apparatus 100 registers as friends (hereinafter, referred to as "friend IDs") to the server 400 at predetermined cycles during a period in which the game apparatus 100 is communicably connected to an access point 200. Upon receiving the friend IDs, the server 400 stores therein the friend IDs in association with apparatus IDs of game apparatuses 100 of which user registration in the server 400 is completed (hereinafter, referred to as "user IDs"). It should be noted that in the present embodiment, those managed by the server 400 are game apparatuses 100 of which the user registration in the server 400 is completed.

Next, features of the communication system 1 according to the present embodiment are described. The first feature is that each game apparatus 100 registers, as a friend, an apparatus ID received from another game apparatus 100 only when the short-range wireless communication with the other game apparatus 100 satisfies a predetermined condition regarding the communication status (communication status condition). For example, the communication status condition may indicate how good the communication status is. This allows each game apparatus 100 to register, as friends, only information processing apparatuses that are located at relatively close distances from the game apparatus 100.

Examples of the communication status condition are as follows: received apparatus ID information (i.e., a received signal) indicates a signal magnitude of a predetermined level (predetermined threshold) or greater; and a communication level, which is calculated based on the signal magnitude and which indicates how good the communication status is between the game apparatus 100 and the other game apparatus 100, is greater than a predetermined level. Alternatively, the game apparatus 100 may transmit a predetermined number of confirmation signals to another game apparatus 100; upon receiving the confirmation signals, the other game apparatus 100 may transmit in return the same number of confirmation signals to the game apparatus 100; and upon receiving the confirmation signals transmitted in return from the other game apparatus 100, the game apparatus 100 may count the number of received confirmation signals. In this manner, the game apparatus 100 can roughly estimate how good the communication status is between the game apparatus 100 and its communication partner (or the distance from the communication partner). Therefore, a specific number of such confirmation signals may be used as the communication status condition.

The second feature is that at predetermined cycles (e.g., at short intervals such as 1/60 sec), the game apparatus 100 automatically searches for an access point 200 which the game apparatus 100 can communicate with. When an access point 200 which the game apparatus 100 can communicate with is found, the game apparatus 100 automatically connects to the access point 200. Then, the game apparatus 100 automatically connects to the server 400 via the access point 200 and the network 300, and performs a process for receiving, from the server 400, information about a communication connection status (e.g., information indicating online or offline) of its friend game apparatus 100 (i.e., connection status information).

In the communication system 1 of the present embodiment, the game apparatus 100 performs wireless communication with an access point 200 to communicate with another game apparatus 100 via the access point 200. Moreover, the game apparatus 100 is a handheld apparatus. Since the game apparatus 100 is carried around by the user, the game apparatus 100 frequently enters, and leaves, the communicable range of the access point 200. As a result, the communication connection status of the game apparatus 100 frequently changes between the online state and the offline state. Furthermore, access points 200 are not limited to those provided in, for example, users' houses but include those provided at various locations outside the user's houses. Accordingly, if a user uses the game apparatus 100 outside his/her house, the communication connection status of the game apparatus 100 changes more frequently. According to the communication system 1 of the present embodiment, the game apparatus 100 obtains, when the game apparatus 100 is in the online state, the communication connection status of its friend game apparatus 100 from the server 400 at predetermined cycles. Therefore, even in a situation where the communication connection status changes frequently, the game apparatus 100 can obtain a change in the communication connection status of its friend game apparatus 100, and notify (inform) the user of the change in the communication connection status of the friend game apparatus 100.

Each game apparatus 100 may execute a friend list application and thereby display the communication connection status (i.e., online or offline) of its friend game apparatus 100. Each game apparatus 100 receives, from its friend game apparatus 100 or the server 400, friend information which is user information about the friend user, and displays the received friend information together with the communication connection status of the friend game apparatus 100. Examples of the friend information include a user name, character information, a message from the friend user, a favorite app ID, and a currently running app ID. The manner of displaying the communication connection status and the friend information will be described in detail below with reference to FIG. 6.

The user of the game apparatus 100, when its friend game apparatus 100 is in login state, can select the friend game apparatus 100 as a partner to play a network game with or as a chat partner.

The network 300 may be a LAN (Local Area Network) or WAN (Wide Area Network).

(Configuration of Game Apparatus)

Hereinafter, the game apparatus 100 is described. The game apparatus 100 is a handheld game apparatus. The game apparatus 100 includes a lower housing 11 and an upper housing 21 as shown in FIG. 2 and FIG. 3A to FIG. 3D. The lower housing 11 and the upper housing 21 are connected to each other so as to be openable and closable (i.e., foldable).

(Description of Lower Housing)

As shown in FIG. 2 and FIG. 3A to 3D, the lower housing 11 includes a lower LCD (Liquid Crystal Display) 12, a touch panel 13, operation buttons 14A to 14L, an analog stick 15, LEDs 16A to LED 16C, an insertion opening 17, and a microphone hole 18.

The touch panel 13 is mounted on the screen of the lower LCD 12. The insertion opening 17 (indicated by dashed lines in FIG. 2 and FIG. 3D) for accommodating a stylus pen 28 is provided in the upper side surface of the lower housing 11.

A cross button 14A (a direction input button 14A), a button 14B, a button 14C, a button 14D, a button 14E, a power button 14F, a selection button 14J, a HOME button 14K, and a start button 14L are provided at the inner side surface (the main surface) of the lower housing 11.

The analog stick 15 is a device for indicating directions.

The microphone hole 18 is provided in the inner side surface of the lower housing 11. Under the microphone hole 18, a microphone 42 (see FIG. 4), which will be described below, is provided as a sound input device.

Figure 3A:
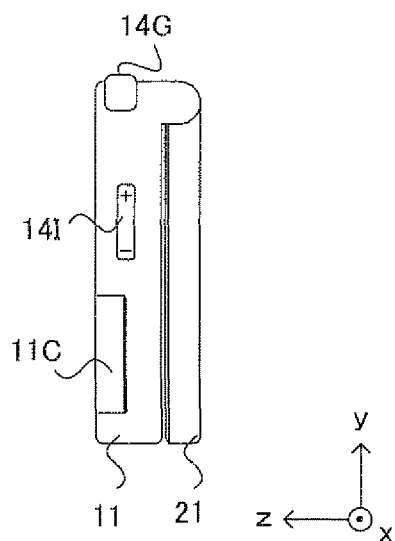
FIG. 3A is a left side view of the game apparatus in a closed state.
Figure 3B:
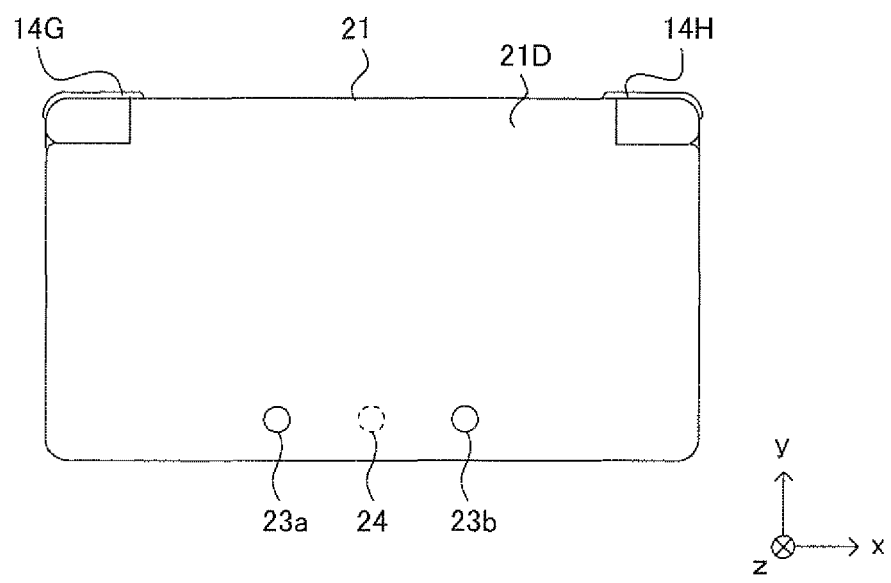
FIG. 3B is a front view of the game apparatus in the closed state.
Figure 3C:
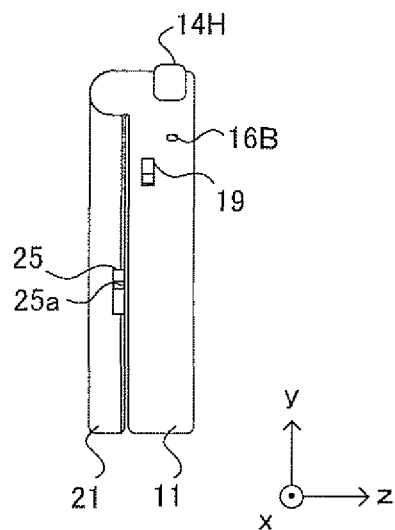
FIG. 3C is a right side view of the game apparatus in the closed state.
Figure 3D:
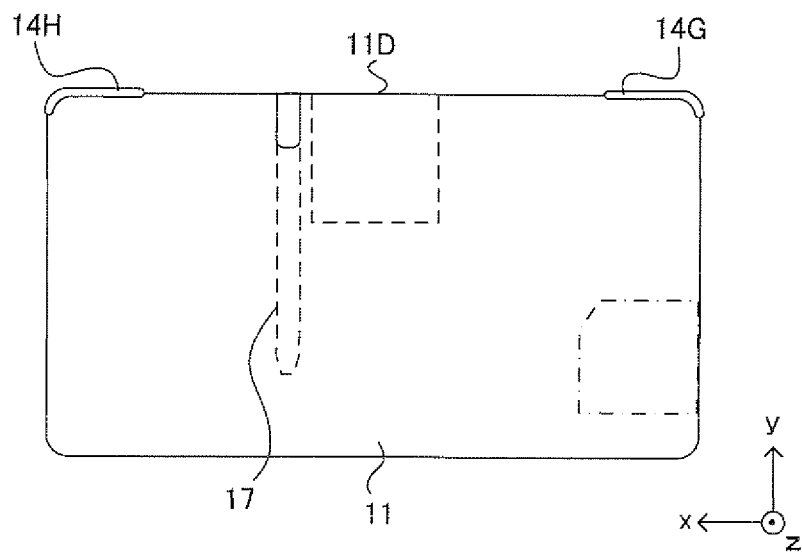
FIG. 3D is a rear view of the game apparatus in the closed state.

As shown in FIG. 3B and FIG. 3D, an L button 14G and an R button 14H are provided at the upper side surface of the lower housing 11. Further, as shown in FIG. 3A, a sound volume button 14I is provided at the left side surface of the lower housing 11. The sound volume button 14I is used for adjusting the sound volume of a speaker 43 (see FIG. 4) of the game apparatus 100.

As shown in FIG. 3A, a cover 11C is provided at the left side surface of the lower housing 11 in an openable and closable manner. Inside the cover 11C, a connector is provided for electrically connecting between the game apparatus 100 and an external data storage memory 45.

As shown in FIG. 3D, an insertion opening 11D, through which an external memory 44 is inserted, is provided at the upper side surface of the lower housing 11.

As shown in FIG. 2 and FIG. 3C, a first LED 16A for notifying the user of the power ON/OFF state of the game apparatus 100 is provided at the lower side surface of the lower housing 11, and a second LED 16B for notifying the user whether wireless communication of the game apparatus 100 is currently established is provided at the right side surface of the lower housing 11. The game apparatus 100 is capable of performing wireless communication with other devices. A wireless switch 19 for enabling/disabling the wireless communication function is provided at the right side surface of the lower housing 11 (see FIG. 3C).

An LED 16C for informing the user of predetermined information is disposed at the inner side of the lower housing 11, at the connection between the lower housing 11 and the upper housing 21. The LED 16C is lit up in, for example, vermilion color to inform the user of a change in the communication connection status of another game apparatus 100 that is registered in the game apparatus 100 as a friend (e.g., a change in the status from offline to online). It should be noted that since the connection between the lower housing 11 and the upper housing 21 is separate from, or independent of, the upper housing 21, the LED 16C is visible to the user even if the game apparatus 100 is in the state of being folded. Thus, not only when the game apparatus 100 is unfolded (i.e., opened) but also when the game apparatus 100 is folded (i.e., closed), the user is allowed to be notified of a change in the communication connection status of another game apparatus 100 that is registered in the game apparatus 100 as a friend.

(Description of Upper Housing)

As shown in FIG. 2 and FIG. 3, the upper housing 21 includes the upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26.

The upper LCD 22 is a display device capable of displaying a stereoscopically visible image. Specifically, the upper LCD 22 is a display device of a parallax barrier type capable of displaying an image which is stereoscopically visible with naked eyes. The upper LCD 22 allows the user to view, by means of a parallax barrier, an image for left eye with the user's left eye and an image for right eye with the user's right eye. In this manner, an image (a stereoscopically visible image) exerting a stereoscopic effect for the user can be displayed. Further, the upper LCD 22 may disable the parallax barrier. When the parallax barrier is disabled, an image can be displayed in a planar manner. Thus, the upper LCD 22 is a display device capable of switching between a stereoscopic display mode for displaying a stereoscopically visible image and a planar display mode for displaying an image in a planar manner (i.e., for displaying a planarly visible image). The switching of the display mode is performed, for example, by the 3D adjustment switch 25, which will be described below.

Two imaging sections (23a and 23b) provided at the outer side surface 21D of the upper housing 21 are collectively referred to as the outer imaging section 23. The outer imaging section (left) 23a and the outer imaging section (right) 23b can be used as a stereo camera in accordance with a program executed by the game apparatus 100.

The inner imaging section 24 is provided at the inner side surface 21B of the upper housing 21, and acts as an imaging section which captures an image in a direction that extends inward from, and normal to, the inner side surface.

The 3D adjustment switch 25 is a slide switch, and is used for switching the display mode of the upper LCD 22 as described above. Further, the 3D adjustment switch 25 is used for adjusting the stereoscopic effect of a stereoscopically visible image (stereoscopic image) that is displayed on the upper LCD 22. The 3D adjustment switch 25 has a slider 25a which is slidable to any position in a predetermined direction (in the longitudinal direction along the right side surface), and the display mode of the upper LCD 22 is set, or the appearance of a displayed stereoscopic image is adjusted, in accordance with the position of the slider 25a.

The 3D indicator 26 is an LED indicating whether the upper LCD 22 is in the stereoscopic display mode.

Further, speaker holes 21E are formed in the inner side surface of the upper housing 21. A sound from the speaker 43, which will be described below, is outputted through the speaker holes 21E.

(Internal Configuration of Game Apparatus 100)

Next, an internal electrical configuration of the game apparatus 100 will be described with reference to FIG. 4. As shown in FIG. 4, the game apparatus 100 includes, in addition to the components described above, electronic components such as an information processing section 31, a main memory 32, an external memory interface (external memory I/F) 33, an external data storage memory I/F 34, an internal data storage memory 35, a wireless communication module 36, a real-time clock (RTC) 37, an acceleration sensor 38, a power supply circuit 40, an interface circuit (I/F circuit) 41, and the like.

The information processing section 31 includes a CPU (Central Processing Unit) 311 for executing a predetermined program, a GPU (Graphics Processing Unit) 312 for performing image processing, and a VRAM (Video RAM) 313. The CPU 311 executes a program stored in a memory (for example, the external memory 44 connected to the external memory I/F 33 or the internal data storage memory 35) inside the game apparatus 100, thereby performing processing in accordance with the program. The program executed by the CPU 311 may be obtained from another device through communication with the other device. The GPU 312 generates an image in accordance with an instruction from the CPU 311, and renders the image in the VRAM 313. The image rendered in the VRAM 313 is outputted to the upper LCD 22 and/or the lower LCD 12, and the image is displayed on the upper LCD 22 and/or the lower LCD 12.

The external memory I/F 33 is an interface for detachably connecting to the external memory 44. The external data storage memory I/F 34 is an interface for detachably connecting to the external data storage memory 45.

The main memory 32 is a volatile storage device used as a work area and a buffer area for (the CPU 311 of) the information processing section 31.

The external memory 44 is a nonvolatile storage device for storing, for example, a program executed by the information processing section 31. The external memory 44 is structured as, for example, a read-only semiconductor memory.

The external data storage memory 45 is structured as a non-volatile readable and writable memory (for example, a NAND flash memory), and is used for storing given data.

The internal data storage memory 35 is structured as a non-volatile readable and writable memory (for example, a NAND flash memory), and is used for storing predetermined data. For example, data and/or programs downloaded via the wireless communication module 36 by wireless communication are stored in the internal data storage memory 35.

The wireless communication module 36 has a function of connecting to a wireless LAN by a method compliant with, for example, IEEE 802.11b/g standard. The wireless communication module 36 has a function of performing short-range wireless communication with the same type of other game apparatuses 100 by a predetermined communication method (for example, communication based on a unique protocol, communication by a method compliant with IEEE 802.11b/g standard, infrared communication, or Bluetooth communication). The wireless communication module 36 performs passing communication, which will be described below, with other game apparatuses 100.

The acceleration sensor 38 detects magnitudes of acceleration (linear acceleration) in the directions of respective straight lines along three axes (xyz axes). The information processing section 31 is capable of detecting the orientation and motion of the game apparatus 100 by receiving data (acceleration data) that indicates acceleration detected by the acceleration sensor 38.

The RTC 37 counts time, and outputs the time to the information processing section 31. The information processing section 31 calculates the current time (date) based on the time counted by the RTC 37. The power supply circuit 40 controls power from a power source (a rechargeable battery) of the game apparatus 100, and supplies the power to each component of the game apparatus 100.

The touch panel 13, the microphone 42, and the speaker 43 are connected to the I/F circuit 41. The I/F circuit 41 includes a sound control circuit for controlling the microphone 42 and the speaker 43 (amplifier), and a touch panel control circuit for controlling the touch panel 13. For example, the sound control circuit performs A/D conversion and D/A conversion on sound signals, and also converts sound signals into a predetermined form of sound data. The touch panel control circuit generates a predetermined form of touch position data based on a signal outputted from the touch panel 13, and outputs the touch position data to the information processing section 31. The information processing section 31 obtains the touch position data to recognize a position, on the touch panel 13, at which an input has been performed.

Operation buttons 14 include the above-described operation buttons 14A to 14L. The operation buttons 14 output, to the information processing section 31, operation data indicating input states of the respective operation buttons 14A to 14L (i.e., indicating whether the operation buttons 14A to 14L have been pressed).

The lower LCD 12 and the upper LCD 22 are connected to the information processing section 31. Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for right eye and an image for left eye, which are stored in the VRAM 313 of the information processing section 31, are outputted to the upper LCD 22. More specifically, the LCD controller alternately repeats reading of pixel data of the image for right eye for one line in the vertical direction, and reading of pixel data of the image for left eye for one line in the vertical direction, thereby reading, from the VRAM 313, the image for right eye and the image for left eye. Thus, an image to be displayed is divided into images for right eye and images for left eye, each of which is a rectangle-shaped image having one line of pixels aligned in the vertical direction. Then, an image, in which the rectangle-shaped images for right eye that are obtained through the division and the rectangle-shaped images for left eye that are obtained through the division are alternately arranged, is displayed on the screen of the upper LCD 22. A user views the image through the parallax barrier in the upper LCD 22, so that the images for right eye are viewed by the user's right eye and the images for left eye are viewed by the user's left eye. In this manner, a stereoscopically visible image is displayed on the screen of the upper LCD 22.

The outer imaging section 23 and the inner imaging section 24 each capture an image in accordance with an instruction from the information processing section 31, and output data of the captured image to the information processing section 31.

The 3D adjustment switch 25 transmits, to the information processing section 31, an electrical signal in accordance with the position of the slider 25a.

The information processing section 31 controls lighting-up of the 3D indicator 26. For example, the information processing section 31 lights up the 3D indicator 26 when the upper LCD 22 is in the stereoscopic display mode.

Figure 5:
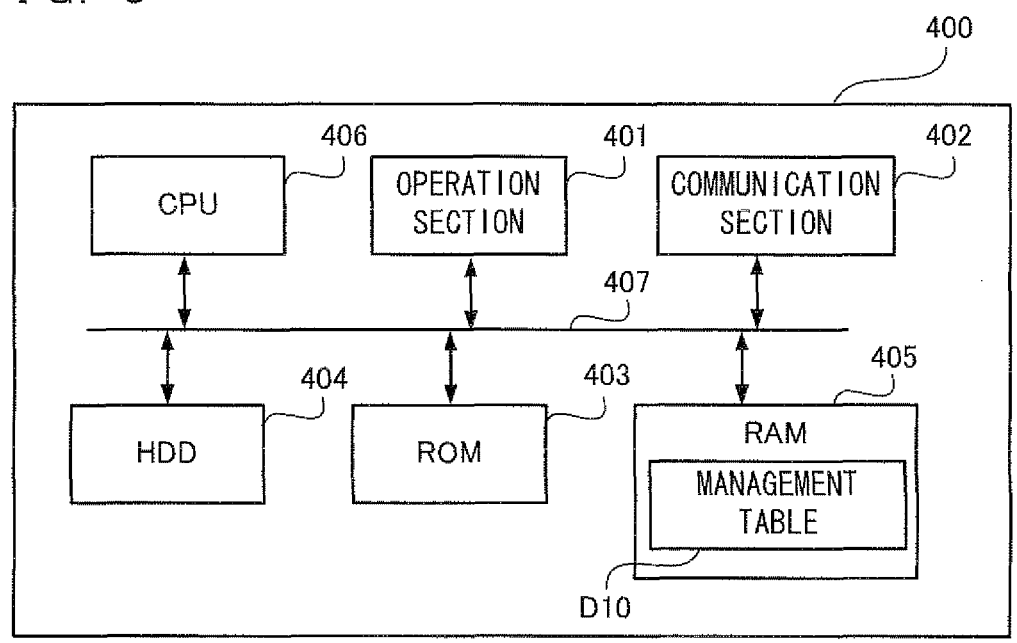
FIG. 5 is a block diagram showing an example of an internal electrical configuration of a server.

Hereinafter, a configuration of the server 400 is described with reference to FIG. 5. FIG. 5 is a block diagram showing an example of an internal electrical configuration of the server 400.

The server 400 includes an operation section 401, a communication section 402, a ROM 403, an HDD 404, a RAM 405, and a CPU 406. These components are communicably connected to one another via a bus 407.

The operation section 401 has a function of receiving an operation performed by an administrator of the server 400. The communication section 402 has a function of communicating with other apparatuses via the network 300. The ROM 403 stores a system program for booting the server 400 and realizing fundamental functions of the server 400. The HDD 404 stores programs including a communication program for allowing the server 400 to communicate with game apparatuses 100, and also stores data that is necessary for the execution of the programs. The RAM 405 functions as a work area for the CPU 406, and stores a management table D10 which is read from the HDD 404. In the management table D10, the apparatus ID of each game apparatus 100, and apparatus IDs (friend IDs) of friend game apparatuses 100 of the game apparatus 100, are registered in association with each other. Moreover, in the management table D10, for each apparatus ID registered therein, connection status information about the corresponding game apparatus 100 (i.e., information indicating online or offline, which is an example of management information of the present invention) is registered in association with the apparatus ID.

Upon receiving from a game apparatus 100 an online notification indicating that the game apparatus 100 is online, the CPU 406 refers to the management table D10 to obtain friend JDs of friend game apparatuses 100 of the game apparatus 100 and the connection status information about the friend game apparatuses 100, and transmits the obtained IDs and the connection status information to the game apparatus 100 which is the source of the online notification. When the CPU 406 has received the online notification from a game apparatus 100, if the connection status information about the game apparatus 100, which is registered in the management table D10, indicates offline, then the registered connection status information is changed to online.

Figure 6:
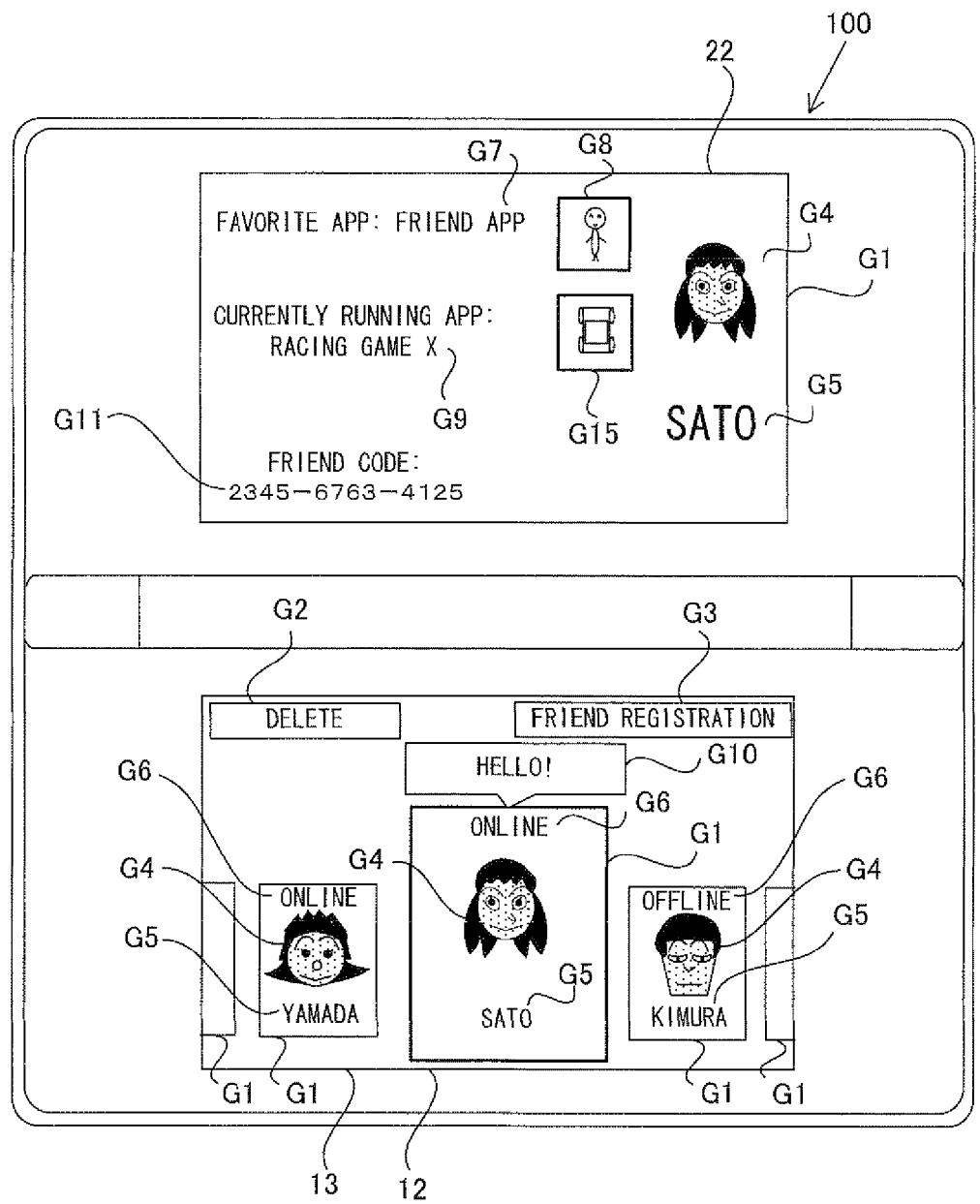

Hereinafter, information displayed by the game apparatus 100 through the execution of the friend list application will be described with reference to FIG. 6. FIG. 6 shows an example of screens that show the communication connection status of friend game apparatuses 100, friend information about the friend game apparatuses 100, and the like.

In FIG. 6, the lower LCD 12 displays images G1 of cards that show friend information (hereinafter, these cards are referred to as a "friend card G1"), an operation button G2, and an operation button G3.

The friend card G1 shows, as friend information, a character G4 representing a friend user and a name G5 of the fried user (hereinafter, "user name G5"). The friend card G1 also shows a text G6 indicating a communication connection status which indicates whether the user of the friend game apparatus 100 is online or offline. This allows the user of the game apparatus 100 to easily view and recognize whether the friend game apparatus 100 corresponding to the friend card G1 is online or offline. Accordingly, if the friend game apparatus 100 is online, the user can easily decide to play a network game or chat with the user of the friend game apparatus 100.

If a plurality of game apparatuses 100 are registered as friends, the lower LCD 12 may display a plurality of friend cards G1. In the example of FIG. 6, there are five game apparatuses 100 registered as friends. In such a case, due to the limited display space of the lower LCD 12, the lower LCD 12 may display only three friend cards G1 for three out of the five game apparatuses 100 (of course, the lower LCD 12 may display more than three friend cards G1). The user can switch the friend cards G1 to be displayed, by performing a slide operation on the touch panel 13 (here, an operation to switch the friend cards G1 to be displayed is not limited to a slide operation but may be an operation using, for example, the L button 140 or R button 14H; the same is true for other operations described below). When the touch panel 13 has received an operation of touching the friend card G1 that is displayed at the center of the lower LCD 12, the friend card G1 is determined to have been selected. Accordingly, the friend card G1 is displayed on the upper LCD 22 in an enlarger manner. Since the friend card G1 is displayed in an enlarger manner, the user can easily view the friend information shown on the selected friend card G1. When the friend card G1 is selected, a message G10 which the friend user has created is displayed above the friend card G1.

The operation button G2 is displayed in order to receive from the user an instruction to delete the selected friend card G1 and the friend registration associated with the friend card G1. When an operation of touching the operation button G2 is received on the touch panel 13, the friend card G1 is deleted and the friend registration associated with the friend card G1 is also deleted. It should be noted that in the present embodiment, game apparatuses 100 are unable to communicate with each other unless they register each other as friends. Therefore, if one game apparatus 100 deletes friend registration associated with another game apparatus 100, then the friend registration associated with the one game apparatus 100 is deleted in the other game apparatus 100, accordingly. However, the display of the friend card G1 that corresponds to the deleted friend registration associated with the one game apparatus 100 remains undeleted on the screen of the other game apparatus 100 so that the user of the other game apparatus 100 will not recognize the deletion of the friend registration.

The operation button G3 is provided for receiving from the user an instruction to perform friend registration to newly add a friend game apparatus 100 (i.e., a friend registration instruction). When the touch panel 13 has received from the user an operation of touching the operation button G3, the game apparatus 100 performs a process for friend registration where a friend game apparatus 100 is newly added (i.e., a friend registration process). The friend registration process will be described below in detail.

As described above, the upper LCD 22 displays the friend card G1 in an enlarger manner. The enlarged friend card G1 shows additional friend information other than the friend information shown on the unenlarged friend card G1. For example, a name G7 of a favorite application of the user corresponding to the friend card G1 (i.e., application name G7), and an icon G8 representing the application, are additionally shown on the enlarged friend card G1. Moreover, a name G9 of an application which the user corresponding to the friend card G1 is currently executing (i.e., application name G9), and an icon G15 representing the application, are also shown on the enlarged friend card G1. This allows the user to know what application the user corresponding to the friend card G1 is currently executing. This allows the user to easily know which user (or which game apparatus 100) is currently executing the same application as the user's application. It should be noted that the friend list application is executable even during the execution of other applications. Therefore, when the user is executing an application, if the user wishes to play a network game using the application, the user may instruct the game apparatus 100 to execute the friend list application to display application names G7. The displayed application names G7 allow the user to confirm applications currently executed by respective friend users. In this manner, the user can search for a game apparatus 100 that is executing the same application as the user's application. This allows the user to easily find a game apparatus 100 that can become a communication partner to play the network game with.

Furthermore, a friend code G11, which is used when the friend registration is performed through the network, is shown on the enlarged friend card G1.

Hereinafter, screens that are displayed in the friend registration process are described with reference to FIG. 7 and FIG. 8. In the friend registration process, game apparatuses 100 can exchange their apparatus IDs by performing short-range wireless communication. For example, game apparatuses 100 transmit to and receive from each other beacon signals that contain their apparatus IDs. In a case where a game apparatus 100 receives an incoming beacon signal, only when the magnitude of the incoming beacon signal satisfies a communication status condition (e.g., being greater than or equal to a predetermined threshold), the game apparatus 100 and the other game apparatus 100 that is the source of the beacon signal exchange their user information as friend information, and the game apparatus 100 displays the other game apparatus 100 as an apparatus that can be registered as a friend (i.e., a friend candidate).

Figure 7:
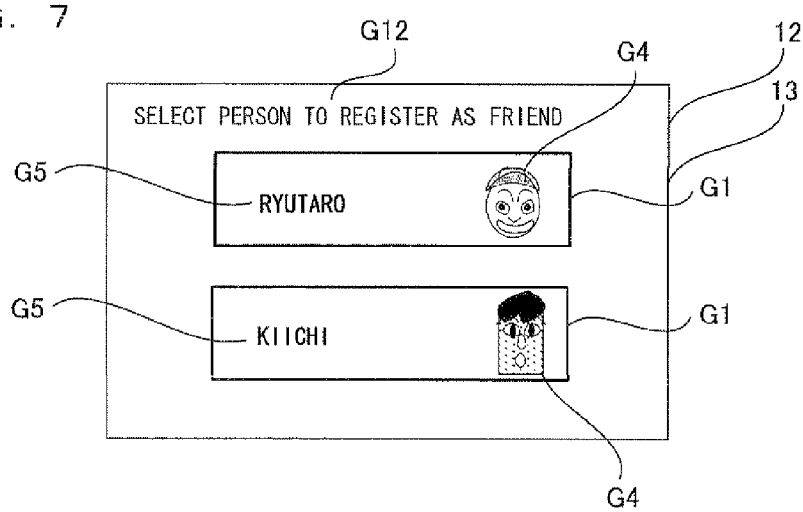
FIG. 7 shows an example of a screen displayed on a lower LCD, which shows friend candidates.

FIG. 7 shows an example of a screen displayed on the lower LCD 12, which shows friend candidates. This screen shows friend cards G1 corresponding to respective friend candidates and a text G12 which prompts the user to select a game apparatus 100 to be a friend. Each friend card G1 shows friend information. The friend information shown on the friend card G1 contains a character G4 and a user name G5. In the present embodiment, each game apparatus 100 is allowed to obtain, within a predetermined period, friend information about a predetermined upper limit number (e.g., 3) of other game apparatuses 100. If the game apparatus 100 has obtained friend information about a plurality of other game apparatuses 100, then a plurality of friend cards G1 are displayed on the lower LCD 12, accordingly. FIG. 7 shows an example where the game apparatus 100 has obtained friend information about two game apparatuses 100 and two friend cards G1 are displayed, accordingly. The user of the game apparatus 100 may select one of the displayed friend cards G1 (by performing, for example, a touch operation of touching one of the friend cards G1), thereby selecting a game apparatus 100 for friend registration.

As described above, even in the case of receiving friend information about a plurality of game apparatuses 100, the user can select a game apparatus 100 for friend registration by viewing friend information such as a character G4 and a user name G5. Therefore, even if game apparatuses 100 that are present within the communicable range of the short-range wireless communication with the user's game apparatus 100 include a game apparatus 100 that the user does not wish to register as a friend, the user can accurately register a desired game apparatus 100 as a friend, without erroneously registering a different game apparatus 100 as a friend.

The friend cards G1 may be sorted and displayed in ascending or descending order of beacon signal magnitude. This helps the user to specify, more accurately, a game apparatus 100 that the user wishes to register as a friend. Accordingly, the user can accurately register a desired game apparatus 100 as a friend.

Figure 8:
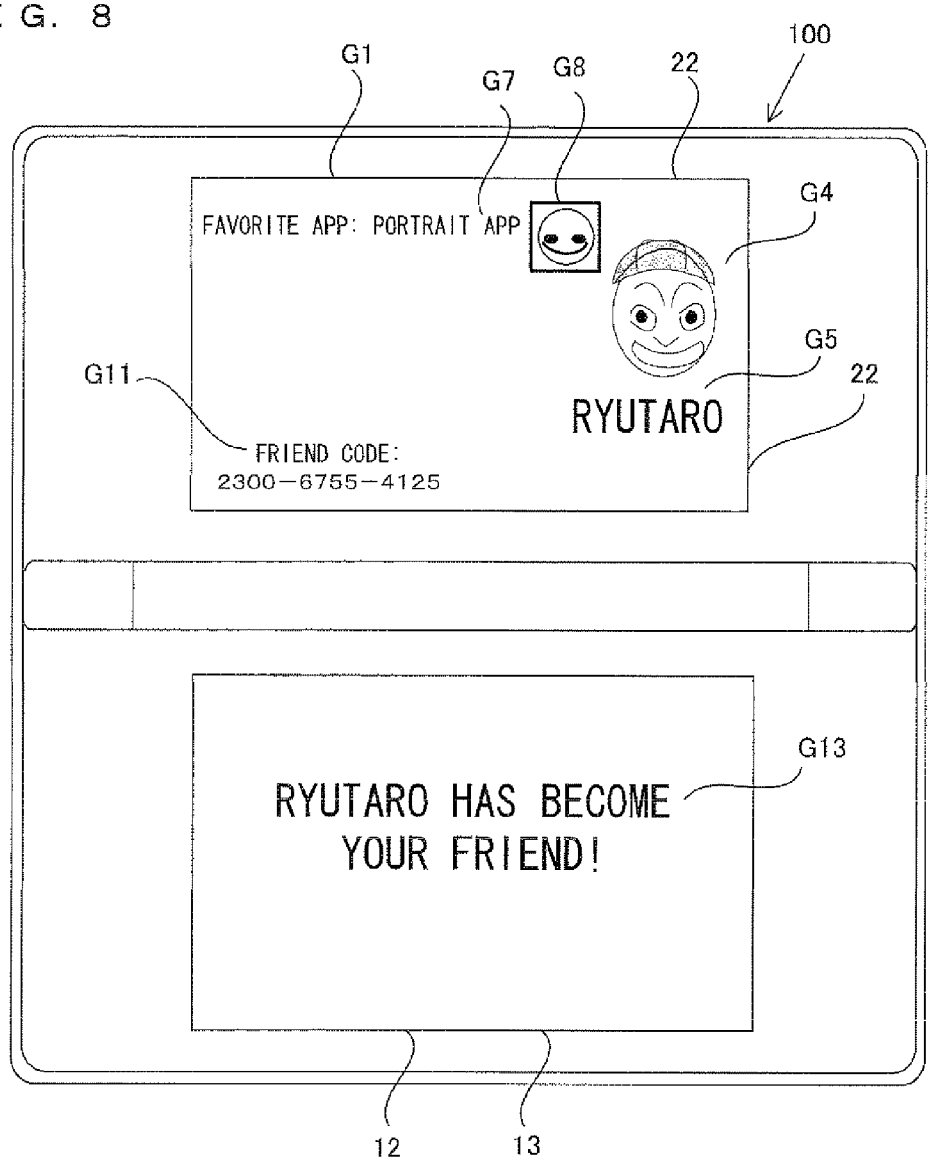
FIG. 8 shows an example of screens that are displayed on an upper LCD and the lower LCD when a friend registration instruction is received.

Described below with reference to FIG. 8 are screens that are displayed on the game apparatus 100 when the friend registration is performed by means of the short-range wireless communication. FIG. 8 shows an example of screens that are displayed on the upper LCD 22 and the lower LCD 12 when a friend registration instruction is received. The upper LCD 22 displays a friend card G1 corresponding to a game apparatus 100 registered as a friend. The contents of friend information shown on the friend card G1 here are basically the same as the contents of friend information shown on the friend card G1 that is displayed on the upper LCD 22 in the example of FIG. 6. However, an application name G9 and an icon G15 are not shown on the friend card G1 in the example of FIG. 8.

The lower LCD 12 displays a text G13 indicating that the friend registration has been successfully completed.

Next, various programs and data that are stored in the main memory 32 of the game apparatus 100 are described with reference to FIG. 9 and FIG. 10A to FIG. 10C.

Figure 9:
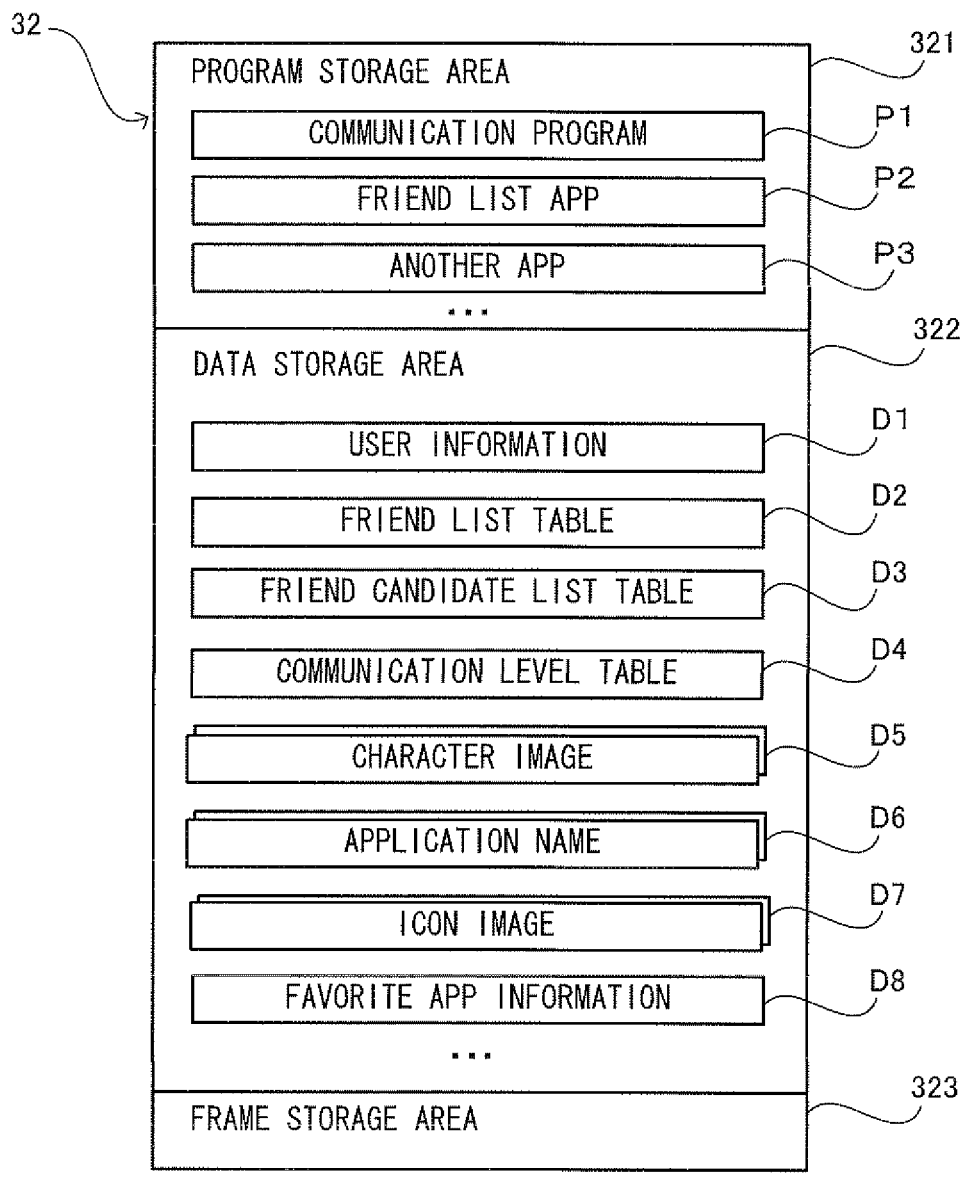
FIG. 9 shows an example of programs and various data that are stored in a main memory.

FIG. 9 shows an example of programs and various data that are stored in the main memory 32. Various data are stored in the main memory 32 in accordance with program execution by the game apparatus 100. The main memory 32 includes a program storage area 321 for storing programs, a data storage area 322 for storing data, and a frame storage area 323.

The program storage area 321 stores at least a communication program P1 for causing the CPU 311 of the game apparatus 100 to perform a communication process, a friend list application P2 for causing the game apparatus 100 to perform a friend management process, and another application P3. The communication process includes: a process of automatically connecting to an access point 200 by means of the wireless communication module 36 and transmitting/receiving information to/from the server 400 via the access point 200; and a process of performing passing communication with another game apparatus 100. The friend management process includes: a process for displaying, to the user, friend information about friend game apparatuses 100; and a friend registration process which is a process for registering another game apparatus 100 as a friend and causing the other game apparatus 100 to register the user's game apparatus 100 as a friend.

The data storage area 322 stores, for example, user information D1, a friend list table D2, a friend candidate list table D3, a communication level table D4, a character image D5, an application name D6, an icon image D7, and favorite app information D8.

The user information D1 is information about the user of the game apparatus 100, which the user inputs at the time of executing the friend list application P2. The user information D1 contains, for example, a user ID, a user name, the user's friend code, the app ID of the user's favorite application, the app ID of an application that is currently running, character information associated with the user (which may be created by the user, for example), and a message created by the user. The term "app ID" herein refers to identification information unique to an application. The user information D1 is transmitted to the server 400 via an access point 200 and the network 300 at the time of requesting the server 400 for user registration, and then registered in the management table D10 (see FIG. 5). It should be noted that, in the friend registration process, the user information D1 is transmitted from the game apparatus 100 to another game apparatus 100. When the user information D1 is received by the other game apparatus 100, the user information D1 is stored in the friend list table D2 of the other game apparatus 100 as friend information.

In the friend list table D2, the apparatus IDs of friend game apparatuses 100 and corresponding friend information are registered in association with each other. FIG. 10A shows an example of the friend list table D2. It should be noted that friend information registered in the friend list table D2 is the same type of information as the above-described user information D1 (here, a user ID and a user name that are contained in the user information D1 received from another game apparatus 100 are managed as a friend ID and a friend name, respectively). Furthermore, in the friend list table D2, connection status information indicating the communication connection status (i.e., whether online or offline) of each friend game apparatus 100 is registered in association with their apparatus ID. The connection status information in the friend list table D2 is updated based on the connection status information about the friend game apparatuses 100 that is received from the server 400. When the game apparatus 100 has logged into the server 400 or when the server 400 has determined that the communication connection status of a friend game apparatus 100 of the game apparatus 100 has changed, the server 400 transmits the connection status information about the friend game apparatus 100 to the game apparatus 100.

In the friend candidate list table D3, the apparatus IDs (friend IDs) of game apparatuses 100 that can be registered as friends, and friend information (friend names, friend codes, and character information) corresponding to the apparatus IDs, are temporarily registered in association with each other in the friend registration process. FIG. 10B shows an example of the friend candidate list table D3. If there are game apparatuses 100 of which the apparatus IDs are registered in the friend candidate list table D3, this means that the game apparatus 100 is exchanging beacon signals containing apparatus IDs with these game apparatuses by means of the short-range wireless communication, and that the magnitude of each beacon signal satisfies the communication status condition.

The magnitudes of signals received by the wireless communication module 36 are classified into multiple categories (e.g., 4 categories). The communication level table D4 defines multiple communication levels that correspond to these multiple categories, respectively. FIG. 10C shows an example of the communication level table D4. In the friend registration process, when the game apparatus 100 receives a beacon signal that contains an apparatus ID, the game apparatus 100 refers to the communication level table D4 to obtain a communication level that corresponds to the magnitude of the beacon signal. The game apparatus 100 then determines based on the communication level whether the magnitude of the beacon signal satisfies the communication status condition.

The character image D5 is image data for generating a character in association with character information registered in the friend list table D2 or character information contained in the user information D1.

The application name D6 is data that is stored in association with an app ID and that indicates the name of an application associated with the app ID. The icon image D7 is image data that is stored in association with an app ID and that represents an icon associated with the app ID.

The favorite app information D8 indicates app IDs that are associated with the friend IDs registered in the friend list table D2. The favorite app information D8 is referred to when there is no application name D6 or icon image D7 associated with an app ID registered in the friend list table D2. That is, the favorite app information D8 indicates, among app IDs for which corresponding application names D6 and icon images D7 are stored in the main memory 32, an app ID that has most recently been updated in the friend list table D2.

The frame storage area 323 stores a communication frame received from another game apparatus 100 or a communication frame to be transmitted to another game apparatus 100.

The above-described information D1 to D7 are read from the internal data storage memory 35 or external data storage memory 45 and then stored in the main memory 32, for example.

Hereinafter, the management table D10 stored in the server 400 is described with reference to FIG. 11. FIG. 11 shows an example of the management table D10. The management table D10 is used to manage, for each game apparatus 100 included in the communication system 1, game apparatuses 100 that the game apparatus 100 registers as friends. In the management table D10, the apparatus IDs of the game apparatuses 100 included in the communication system 1 are registered and each apparatus ID is registered together with the following information corresponding thereto: user information D1 (including a user name, friend code, favorite app ID, currently running app ID, character information, and a message); connection status information; a login determination flag; and friend IDs. It should be noted that the game apparatuses 100 of which the apparatus IDs are registered in the management table D10 are not all the game apparatuses 100 included in the communication system 1 but only the game apparatuses 100 that have requested user registration.

An apparatus ID and user information D1 are transmitted from a game apparatus 100 to the server 400 when the game apparatus 100 requests user registration, and then received and registered by the server 400. The connection status information indicates whether the communication connection status of the game apparatus 100 is online or offline. The connection status information is updated based on an online notification which the server 400 receives from the game apparatus 100. The game apparatus 100 transmits, at predetermined cycles during a period in which the game apparatus is connected to an access point 200, an online notification for notifying the server 400 of the online state of the game apparatus 100. Specifically, the connection status information is updated when the server 400 has received the online notification from the game apparatus 100, such that the connection status information indicates the online state. If no online notification is received from the game apparatus 100, the connection status information is updated such that the connection status information indicates the offline state. It should be noted that the connection status information about the game apparatus 100 may be updated to indicate the offline state if no online notification is received from the game apparatus 100 for a predetermined period since the most recent reception of the online notification from the game apparatus 100. Moreover, the server 400 may request the game apparatus 100 to transmit an online notification, and if there is no response from the game apparatus 100, the server 400 may determine the game apparatus 100 to be offline. The online notification from the game apparatus 100 may be identification information unique to the game apparatus 100, or may be other type of information.

The login determination flag is a flag for determining, when the server 400 has received the online notification from the game apparatus 100, whether the game apparatus 100 is in login state or logoff state. If the login determination flag is off, the server 400 determines the game apparatus 100 to be in login state. If the login determination flag is on, the server 400 determines the game apparatus 100 to be in logoff state.

The friend ID is the apparatus ID of another game apparatus 100 that is registered as a friend in the game apparatus 100. In response to a request from the server 400, the game apparatus 100 transmits, to the server 400, friend IDs that are registered in the friend list table D2 of the game apparatus 100. The server 400 updates the management table D10 based on the received friend IDs.

Figure 12:
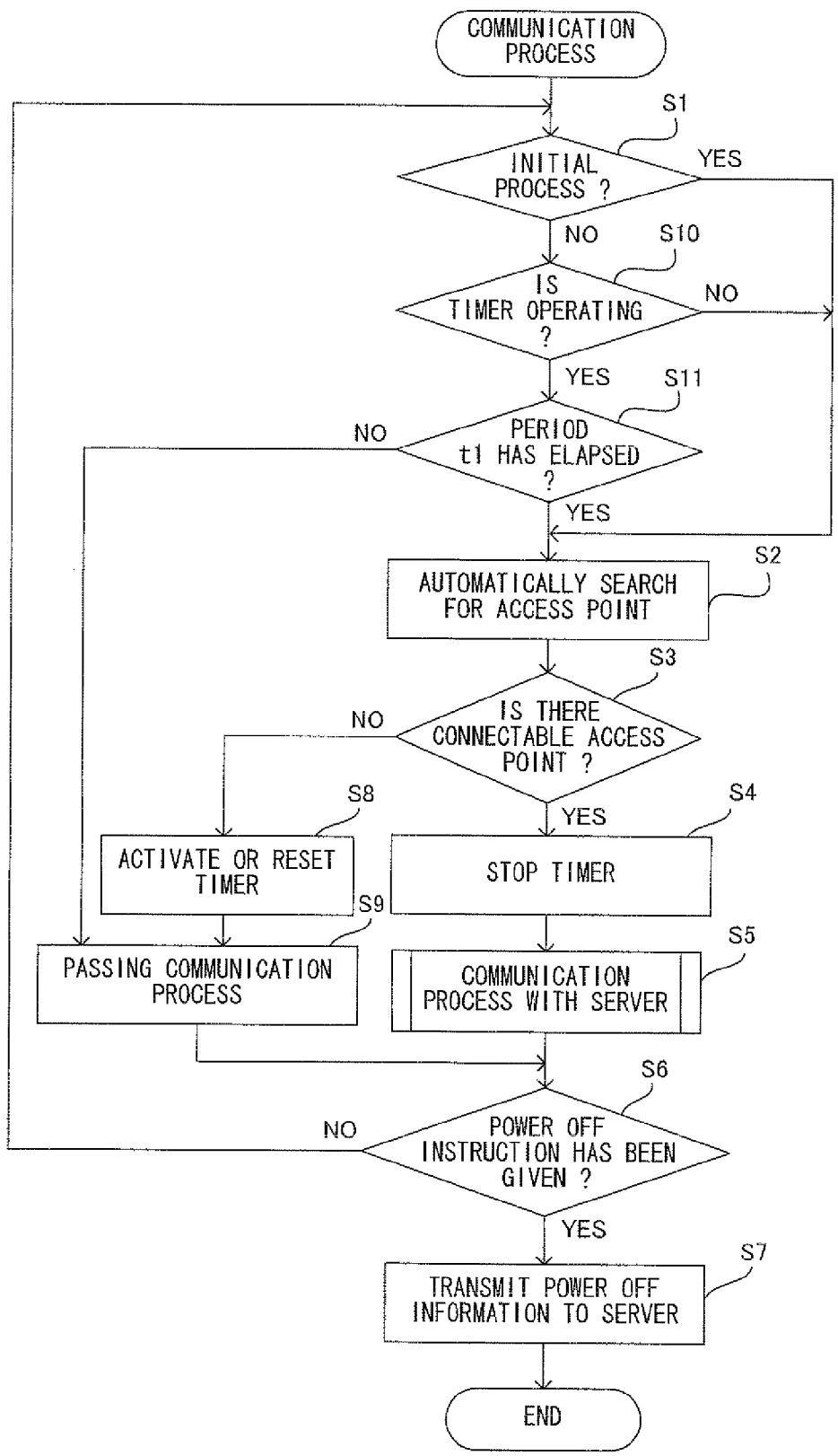
FIG. 12 is a flowchart showing an example of a communication process.

Hereinafter, an example of the communication process performed by the CPU 311 is described with reference to FIG. 12. It should be noted that the flowchart in FIG. 12 is merely an example. Accordingly, the sequence of process steps may be altered so long as the same results are obtained. The same is true for the other flowcharts shown in FIG. 13 to FIG. 18, FIG. 21, FIG. 22, and FIG. 24, which will be described below.

FIG. 12 is a flowchart showing an example of the communication process. The communication process is started by using the wireless communication module 36 when the game apparatus 100 is powered on. First, the CPU 311 determines whether the process performed at this time is an initial process since the start of the communication process (S1). If the process performed at this time is determined to be an initial process since the start of the communication process (YES at S1), the CPU 311 automatically searches for a connectable access point 200 (S2). Specifically, the CPU 311 automatically attempts to receive beacon signals transmitted from the access points 200, by means of short-range wireless communication. However, if a connectable access point has already been found (or if the CPU 311 is currently connected to an access point), it is not necessary for the CPU 311 to search for a connectable access point. Then, the CPU 311 determines whether there exists a connectable access point 200 (S3). For example, the CPU 311 determines whether a beacon signal has been received from any access point 200. If it is determined that there exists a connectable access point 200 (YES at S3), then the CPU 311 stops a timer if the timer is operating (S4). The CPU 311 performs no processing at step S4 if the timer is not operating. Then, the CPU 311 performs a process for transmitting/receiving information to/from the server 400 (communication process with the server) (S5). The communication process with the server will be described in detail below with reference to FIG. 13. Thereafter, the CPU 311 determines whether the user has inputted an instruction to power off the game apparatus 100 (S6). If it is determined that the user has inputted an instruction to power off the game apparatus 100 (YES at S6), then the CPU 311 transmits, to the server 400, power off information for notifying the server 400 of the game apparatus 100 being powered off (S7). Thereafter, the CPU 311 ends the communication process. If it is determined that the user has not inputted an instruction to power off the game apparatus 100 (NO at S6), the CPU 311 returns the processing to step S1. It should be noted that the process steps S1 to S6 and process steps S8 to S11, which will be described below, are repeated at predetermined cycles (e.g., at short cycles such as once in every 1160 sec) until it is determined that the user has inputted an instruction to power off the game apparatus 100.

Described next is a process that is performed when it is determined "NO" at step S3. If it is determined that there is no connectable access point 200 (NO at S3), the CPU 311 causes the timer to start operating if the timer is not operating (i.e., the CPU 311 starts a time keeping process), or resets the timer to return the count value of the timer to an initial value if the timer is operating (S8). Thereafter, the CPU 311 performs a passing communication process (S9). In this manner, if the CPU 311 is unable to connect to any access point 200, the passing communication process is performed.

The passing communication process is described below in detail. The game apparatus 100 broadcasts beacon signals by short-range wireless communication. If the game apparatus 100 receives a connection request from another game apparatus 100 that has received a beacon signal from the game apparatus 100, then the game apparatus 100 transmits a connection response to the other game apparatus 100. Thereafter, the game apparatus 100 establishes a connection to the other game apparatus 100 and thereby transmits/receives predetermined information to/from the other game apparatus 100. The predetermined information is the aforementioned user information D1, for example. Accordingly, the game apparatus 100 can obtain the user information D1 from another game apparatus 100 that has passed by the game apparatus 100. It should be noted that if the game apparatus 100 has received a beacon signal from another game apparatus 100, then the game apparatus 100 transmits a connection request to the other game apparatus 100. Thereafter, the game apparatus 100 receives a connection response from the other game apparatus 100 which has received the connection request.

The CPU 311 performs the above-described step S6 after performing the passing communication process at step S9.

Described next is a process that is performed when it is determined "NO" at step S1. If the process performed at this time is determined not to be an initial process since the start of the communication process (NO at S1), the CPU 311 determines whether the timer is operating (S10). It should be noted that the timer is activated and starts operating when step S8 is performed in a case where there is no connectable access point 200. If it is determined that the timer is not operating (NO at S10), the CPU 311 advances the processing to step S2 at which the CPU 311 performs the process of automatically searching for an access point 200. On the other hand, if it is determined that the timer is operating (YES at S10), the CPU 311 determines whether the timer indicates that a period t1 has elapsed (S11).

If the timer indicates that the period t1 has elapsed (YES at S11), the CPU 311 advances the processing to step S2 at which the CPU 311 performs the process of automatically searching for an access point 200. On the other hand, if the timer does not indicate that the period t1 has elapsed (NO at S11), the CPU 311 advances the processing to step S9 to perform the passing communication process, without performing the process (S2) of automatically searching for an access point 200. In this manner, if a connectable access point 200 is not found, then from this point, the game apparatus 100 refrains from performing the process of searching for an access point 200 and performs the passing communication process until the period t1 has elapsed.

Next, the communication process with the server, which is performed at step S5, is described with reference to FIG. 13.

Figure 13:
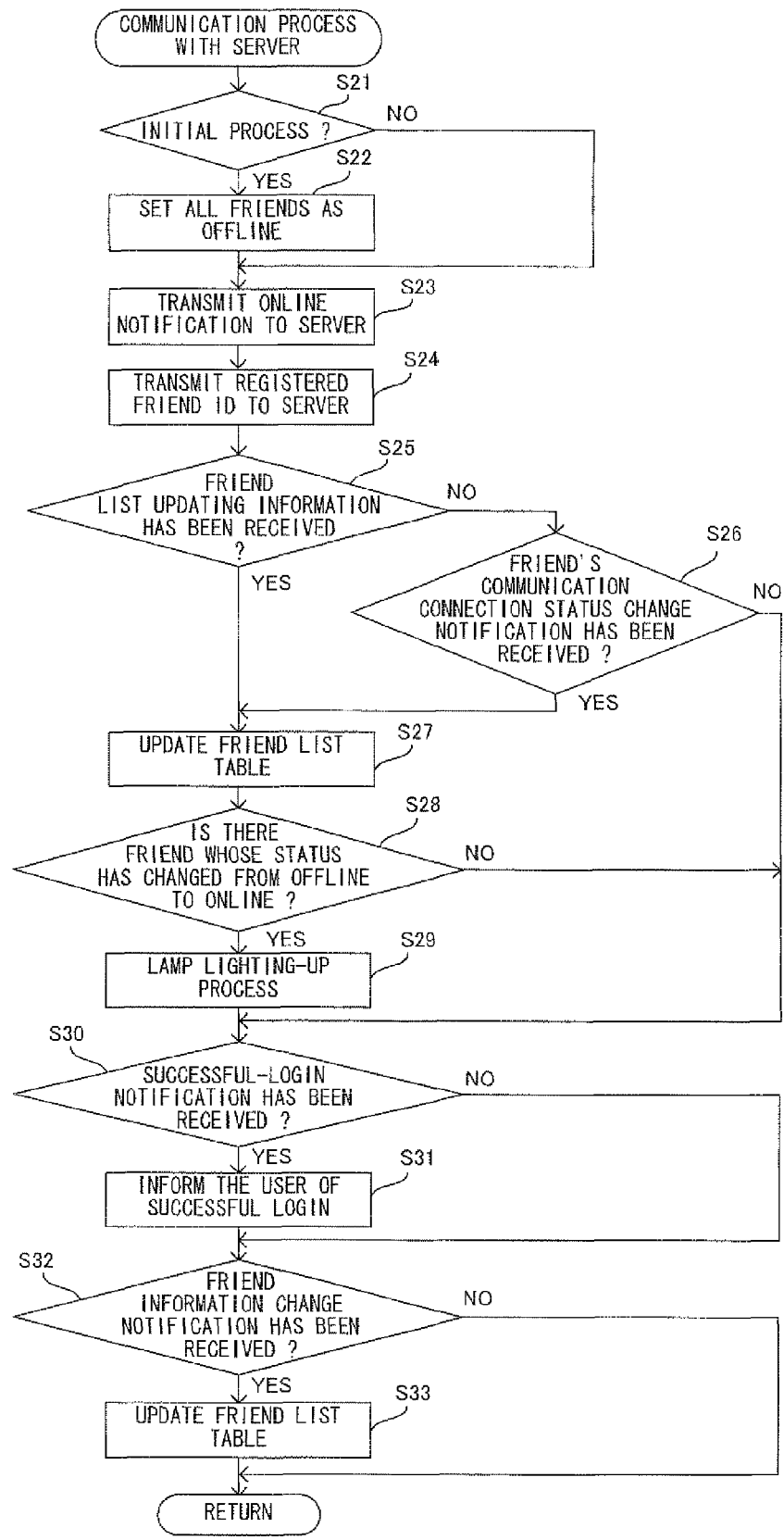
FIG. 13 is a flowchart showing an example of a communication process with the server.

FIG. 13 is a flowchart showing an example of the communication process with the server. It should be noted that in FIG. 13, a friend game apparatus 100 is simply indicated as "FRIEND". First, the CPU 311 determines whether the process performed at this time is an initial communication process with the server since the start of the communication process (S21). If it is determined that the process performed at this time is an initial communication process with the server since the start of the communication process (YES at S21), then the CPU 311 updates all the connection status information associated with all the apparatus IDs registered in the friend list table D2 to indicate the offline state (S22). Thereafter, the CPU 311 advances the processing to step S23. On the other hand, if it is determined that the process performed at this time is not an initial communication process with the server since the start of the communication process (NO at S21), the CPU 311 advances the processing to step S23 without performing step S22.

At step S23, the CPU 311 transmits to the server an online notification that contains the apparatus ID of the game apparatus 100. Next, upon receiving from the server 400 a request to transmit friend IDs (this request is transmitted from the server 400 at step S49 or S56 of a server-side communication process, which will be described below with reference to FIG. 14), the CPU 311 transmits information that contains all the friend IDs registered in the friend list table D2 to the server 400 (S24). Thereafter, the CPU 311 determines whether friend list updating information has been received (S25). The friend list updating information is transmitted from the server 400 at step S53 of the server-side communication process, which will be described below with reference to FIG. 14. The friend list updating information is received only when the game apparatus 100 has logged into the server 400. The friend list updating information contains: the apparatus IDs of all the friend game apparatuses 100 of the game apparatus 100; the user information D1 associated with these apparatus IDs (i.e., friend information); and the connection status information associated with these apparatus IDs. If it is determined that the friend list updating information has been received (YES at S25), the CPU 311 advances the processing to step S27, which will be described below. Here, if the friend list updating information has been received, the CPU 311 may perform steps S103 and S104, which will be described below with reference to FIG. 17. To be specific, the CPU 311 refers to the friend list table D2 stored in the game apparatus 100 to determine whether there is, for example, any unregistered friend information. If it is determined that there is unregistered friend information, the CPU 311 performs a process for obtaining, from the server 400, the unregistered friend information to be registered into the friend list table D2. Unregistered friend information to be registered into the friend list table D2 is as described below, for example. Assume a case where a friend user inputs user information D1. In this case, for example, the friend user may not input a particular type of information such as his/her favorite application name, and the friend user may later input such previously omitted information. Such omitted information is hereinafter referred to as unregistered friend information.

On the other hand, if it is determined that the friend list updating information has not been received (NO at S25), the CPU 311 determines whether a friend's communication connection status change notification has been received (S26). The friend's communication connection status change notification is information that is transmitted from the server 400 at step S54 or S71 of the server-side communication process, which will be described below with reference to FIG. 14. The friend's communication connection status change notification is transmitted from the server 400 to the game apparatus 100 when the communication connection status of a friend game apparatus 100 of the game apparatus 100 has changed. The friend's communication connection status change notification contains the apparatus ID of the friend game apparatus 100 and the connection status information associated with the apparatus ID. If it is determined that the friend's communication connection status change notification has been received (YES at S26), the CPU 311 advances the processing to step S27 which is described below.

Next, the process at step S27 is described. At step S27, the CPU 311 updates the registered contents in the friend list table D2 by using the information that is determined to have been received at step S25 or S26 (S27). For example, if friend list updating information has been received, then the CPU 311 updates, with the received latest information, the information in the friend list table D2 such as friend IDs, friend information, and connection status information. In this manner, changes that have been made in the friend information about friend game apparatuses 100 during an offline period of the game apparatus 100 can be incorporated into the friend list table D2 of the game apparatus 100.

In the case of updating a favorite app ID in the friend list table D2 to a new ID, the CPU 311 determines whether an application name D6 and an icon image D7 that correspond to the new app ID are stored in the main memory 32. Only when an application name D6 and an icon image D7 that correspond to the new app ID are stored in the main memory 32, the favorite app information D8 is updated with the new app ID. The number of pieces of favorite app information D8 stored in the main memory 32 is equivalent to the number of friend IDs associated with the favorite app information D8. Accordingly, if a favorite app ID is updated, then a piece of favorite app information D8 that is associated with a friend ID that is associated with the updated favorite app ID is updated. As a result, the favorite app information D8 indicates the newest app IDs that are associated with respective application names D6 and respective icon images D7 that are stored in the main memory 32. If there is no application name D6 and icon image D7 that correspond to a favorite app ID registered in the friend list table D2, the corresponding application name D6 and icon image D7 can be obtained by using the favorite app information D8 and then displayed.

At step S27, the CPU 311 determines whether there is a game apparatus 100 (friend game apparatus 100) of which the communication connection status has been updated from offline to online (S28). If it is determined that there is a friend game apparatus 100 of which the communication connection status has been updated from offline to online (YES at S28), the CPU 311 performs a lamp lighting-up process (S29). The lamp lighting-up process is a process of lighting up the LED 16C in, for example, vermilion color (see FIG. 2). Through this process, the user can be informed that there is a game apparatus 100 (friend game apparatus 100) of which the communication connection status has changed from offline to online. In the present embodiment, the lamp lighting-up process is not performed when the communication connection status has been updated from online to offline. However, as an alternative, the lighting up process may be performed in such a case. Thereafter, the CPU 311 advances the processing to step S30. If it is determined that there is no friend game apparatus 100 of which the communication connection status has been updated from offline to online (NO at S28), the CPU 311 advances the processing to step S30 without performing step S29.

Next, a process that is performed when it is determined "NO" at step S26 is described. If it is determined that a friend's communication connection status change notification has not been received (NO at S26), the CPU 311 advances the processing to step S30 without performing the above-described process steps S27 to S29.

Next, a process at step S30 is described. The CPU 311 determines whether a successful-login notification has been received (S30). The successful-login notification is a notification about a successful login of the game apparatus 100 into the server 400. The successful-login notification is transmitted from the server 400 to the game apparatus 100 at step S55 of the server-side communication process, which will be described below with reference to FIG. 15. If it is determined that a successful-login notification has been received (YES at S30), then the CPU 311 performs a process for informing the user of the successful login (S31). For example, the CPU 311 displays a message indicating the successful login on the upper LCD 22 (see FIG. 2) or the lower LCD 12 (see FIG. 2). Thereafter, the CPU 311 advances the processing to step S32. On the other hand, if it is determined that a successful-login notification has not been received (NO at S30), the CPU 311 advances the processing to step S32 without performing the above-described step S31.

At step S32, the CPU 311 determines whether a friend information change notification has been received (S32). If it is determined that a friend information change notification has been received (YES at S32), the CPU 311 updates the friend list table D2 with a friend ID, friend information, and the like that are contained in the friend information change notification (S33). The friend information change notification is transmitted from the server 400 at step S61 in FIG. 15. If the server 400 has received from a game apparatus 100 a change in the user information, then the server 400 transmits a friend information change notification to friend game apparatuses 100 of the game apparatus 100, thereby notifying the friend game apparatuses 100 about the change in the user information (i.e., friend information). Here, the favorite app information D8 is also updated as necessary in a manner that is similar to one previously described for step S27. Thereafter, the CPU 311 ends the communication process with the server and advances the processing to step S6 of FIG. 12. On the other hand, if it is determined that a friend information change notification has not been received (NO at S32), the CPU 311 ends the communication process with the server without performing the above-described step S33, and advances the processing to step S6 of FIG. 12.

Figure 14:
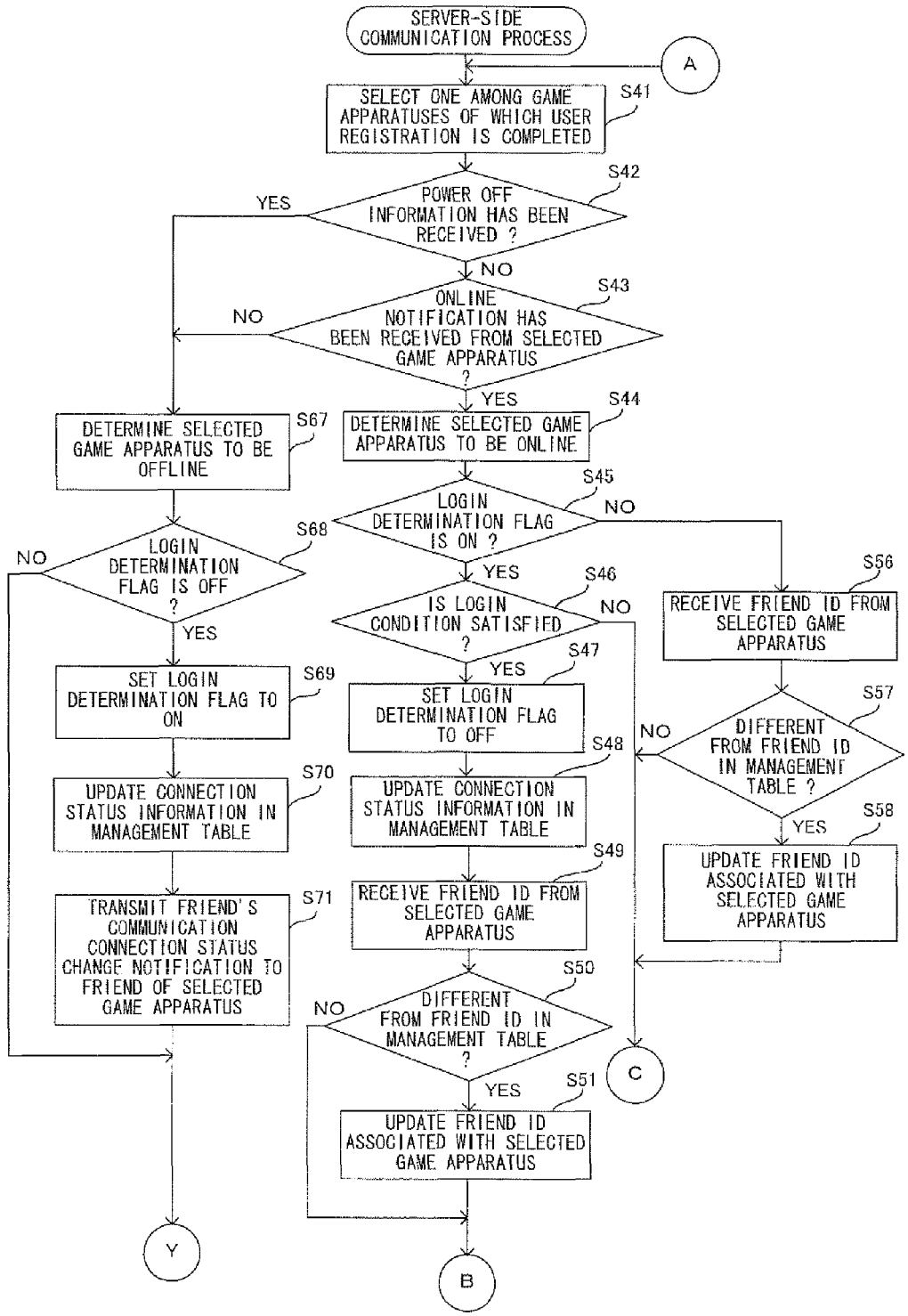
FIG. 14 is a flowchart showing an example of a server-side communication process.
Figure 15:
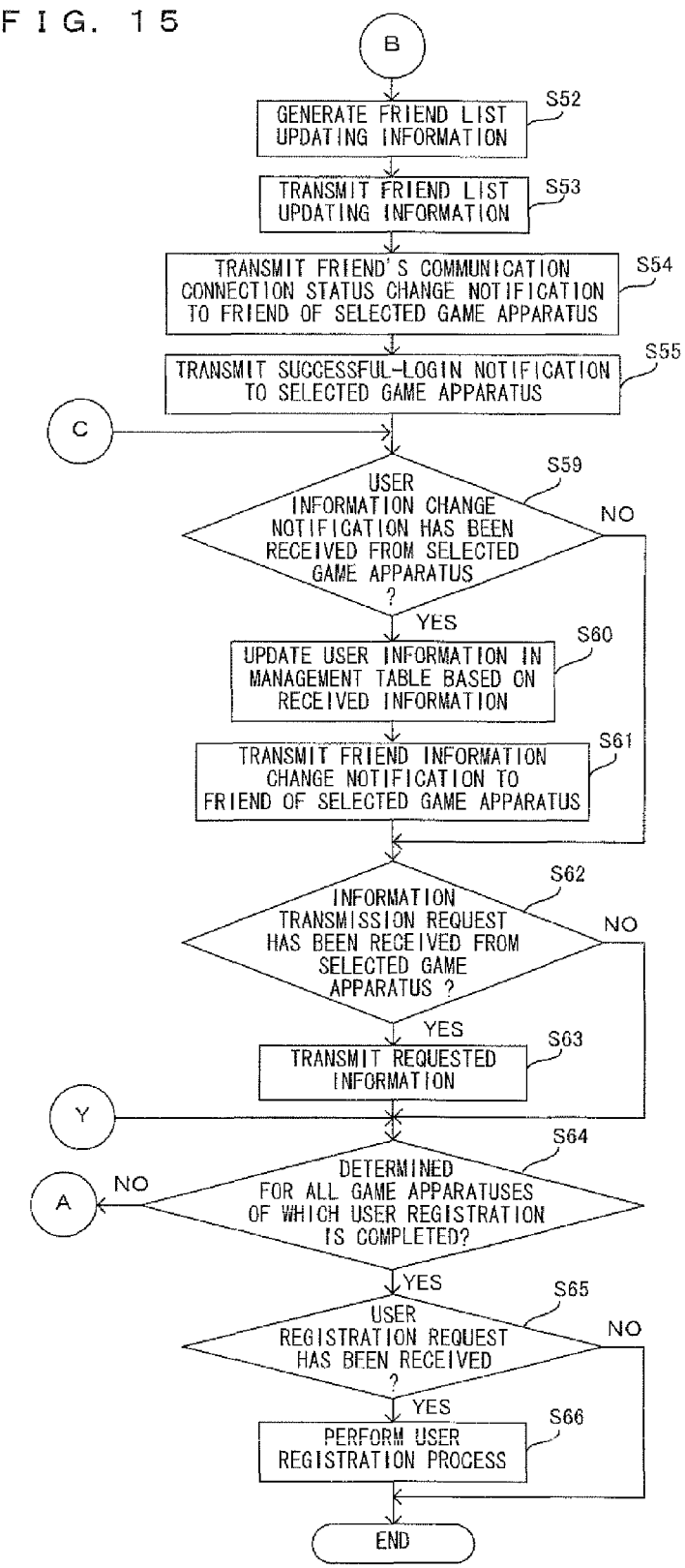
FIG. 15 is a flowchart showing the example of the server-side communication process.

Hereinafter, the server-side communication process performed by the server 400 (the CPU 406 shown in FIG. 5) is described with reference to FIG. 14 and FIG. 15. FIG. 14 and FIG. 15 are a flowchart showing an example of the server-side communication process. The server-side communication process is performed when the CPU 406 executes a communication program (not shown) stored in the RAM 405. The server-side communication process is repeated at predetermined cycles.

The CPU 406 selects one among the game apparatuses 100 registered in the management table D10 (see FIG. 11) (i.e., one among the game apparatuses 100 of which the user registration is completed) (S41). Here, one game apparatus 100 is selected through the selection of its apparatus ID. Next, the CPU 406 determines whether power off information associated with the selected game apparatus 100 has been received (i.e., whether power off information containing the selected apparatus ID has been received) (S42). The power off information is transmitted from the game apparatus 100 at step S7 of FIG. 12. Instead of power off information, information indicating a change in the communication connection status into the offline state, or the apparatus ID of the game apparatus 100, may be transmitted. If it is determined that power off information associated with the selected game apparatus 100 has not been received (NO at S42), then the CPU 406 determines whether an online notification has been received from the selected game apparatus 100 (i.e., whether an online notification containing the selected apparatus ID has been received) (S43). The online notification is transmitted from the game apparatus 100 at step S23 of FIG. 13, and contains the apparatus ID of the game apparatus 100.

If it is determined that an online notification has been received from the selected game apparatus 100 (YES at S43), then the CPU 406 determines the communication connection status of the selected game apparatus 100 to be online (S44). Then, the CPU 406 determines whether, in the management table D10, the login determination flag that is associated with the selected apparatus ID is ON (S45). If the login determination flag is ON, this means that the game apparatus 100 is currently in logoff state. If the login determination flag is OFF, this means that the game apparatus 100 is currently in login state. If it is determined that the login determination flag is ON (i.e., the game apparatus 100 is currently in logoff state) (YES at S45), then the CPU 406 determines whether the selected game apparatus 100 satisfies a predetermined login condition (S46). For example, the predetermined login condition is that the user of the selected game apparatus 100 is not registered as an invalid user.

If it is determined that the selected game apparatus 100 does not satisfy the predetermined login condition (NO at S46), the CPU 406 advances the processing to step S59, which will be described below. If it is determined that the selected game apparatus 100 satisfies the predetermined login condition (YES at S46), the CPU 406 sets, in the management table D10, the login, determination flag that is associated with the selected apparatus ID to OFF, thereby allowing the selected game apparatus 100 to log into the server 400 (S47). Thereafter, the CPU 406 changes, in the management table D10, the connection status information that is associated with the selected apparatus ID, to indicate the online state (S48). Although in the present embodiment the login determination flag is used, it is not essential to use the login determination flag. For example, the connection status information in the management table D10 may be updated when it is determined that the selected game apparatus 100 satisfies the predetermined login condition. Next, the CPU 406 requests the selected game apparatus 100 to transmit friend IDs, and then receives the friend IDs which the game apparatus 100 transmits in response to the request (S49). The friend IDs are transmitted from the game apparatus 100 at step S24 of FIG.

Then, the CPU 406 determines whether the friend IDs received at step S49 are different from the friend IDs registered in the management table D10 (S50). If it is determined that the friend IDs received at step S49 are different from those registered in the management table D 10 (YES at S50), then the friend IDs, in the management table D10, that are associated with the selected apparatus ID are updated with the received friend IDs (S51). Thereafter, the CPU 406 performs step S52, which will be described below. On the other hand, if it is determined that the friend IDs received at step S49 are the same as those registered in the management table D10 (NO at S50), then the CPU 406 performs step S52, which will be described below, without performing step S51.

At step S52, the CPU 406 generates friend list updating information that contains, as friend information, the selected apparatus ID and the user information D1 (friend name, friend code, favorite app ID, currently running app ID, character information, message, and connection status information) associated with the selected apparatus ID (friend ID).

Thereafter, the CPU 406 transmits the friend list updating information to the selected game apparatus 100 (S53). Further, the CPU 406 transmits a friend's communication connection status change notification to friend game apparatuses 100 of the selected game apparatus 100 (S54). The friend's communication connection status change notification is transmitted for the purpose of notifying the friend game apparatuses 100 about a change in the connection status information of the selected game apparatus 100 from offline to online. The friend's communication connection status change notification is received by the friend game apparatuses 100 at step S26 of FIG. 13. Next, the CPU 406 transmits a successful-login notification to the selected game apparatus 100 (S55). Thereafter, the CPU 406 performs step S59, which will be described below.

Described next is a process that is performed when it is determined that the login determination flag is OFF (NO at S45). In this case, the CPU 406 requests the selected game apparatus 100 to transmit friend IDs, and then receives the friend IDs which the game apparatus 100 transmits in response to the request (S56). The friend IDs are transmitted from the game apparatus 100 at step S24 of FIG. 13.

Then, the CPU 406 determines whether the friend IDs received at step S56 are different from the friend IDs registered in the management table D10 (S57). If it is determined that the friend IDs received at step S56 are different from those registered in the management table D10 (YES at S57), then the friend IDs, in the management table D10, that are associated with the selected apparatus ID are updated with the received friend IDs (S58). Thereafter, the CPU 406 performs step S59, which will be described below. On the other hand, if it is determined that the friend IDs received at step S56 are the same as those registered in the management table D10 (NO at S57), then the CPU 406 performs step S59, which will be described below, without performing step S58.

Next, the process performed at step S59 is described. The CPU 406 determines whether a user information change notification has been received from the selected game apparatus 100 (S59). The user information change notification is information transmitted from the game apparatus 100 to the server 400 when the user information D1 registered in the game apparatus 100 has been changed. The user information change notification is transmitted from the game apparatus 100 at step S98 of the friend management process, which will be described below with reference to FIG. 17. If it is determined that a user information change notification has not been received from the selected game apparatus 100 (NO at S59), the CPU 406 performs step S62, which will be described below. On the other hand, if it is determined that a user information change notification has been received from the selected game apparatus 100 (YES, at S59), then based on the received user information change notification, the CPU 406 updates, in the management table D10, the user information D1 that is associated with the selected apparatus ID (S60). Then, the CPU 406 refers to the management table D10 to obtain friend IDs of the game apparatus 100 that is the source of the user information change notification, and transmits a friend information change notification containing the updated user information D1 to each of the game apparatuses 100 associated with the friend IDs (S61). The friend information change notification is received by these game apparatuses 100 at step S32 of FIG. 13.

Next, the CPU 406 determines whether an information transmission request has been received from the selected game apparatus 100 (S62). The information transmission request is information which the game apparatus 100 transmits, at the time of displaying friend information, for the purpose of requesting the server 400 to transmit any friend information, application names D6, and icon images D7 that are not stored in the game apparatus 100. The information transmission request is transmitted at step S104 of the friend management process, which will be described below with reference to FIG. 17. If it is determined that an information transmission request has been received from the selected game apparatus 100 (YES at S62), then the CPU 406 transmits the requested information to the game apparatus 100 (S63). It should be noted that the server 400 stores application names D6 and icon images D7 that are associated with all the app IDs used in the communication system 1. Thereafter, the CPU 311 performs step S64, which will be described below. On the other hand, if it is determined that an information transmission request has not been received from the selected game apparatus 100 (NO at S62), the CPU 406 performs step S64, which will be described below, without performing the above-described step S63.

Then, the CPU 311 determines whether the determination at step S42 has been performed for all the game apparatuses 100 of which the user registration is completed (i.e., for all the apparatus IDs registered in the management table D10) (S64). If it is determined that the determination at step S42 has not fully been performed for all the game apparatuses 100 of which the user registration is completed (NO at S64), then the CPU 406 returns the processing to step S41. At step S41, one game apparatus 100 of which the user registration is completed and for which the determination at step S42 has not yet been performed is newly selected. On the other hand, if it is determined that the determination at step S42 has been performed for all the game apparatuses 100 of which the user registration is completed (YES at S64), then the CPU 406 determines whether a user registration request has been received from any game apparatus 100 (S65). The user registration request is information which a game apparatus 100 transmits for the purpose of requesting its apparatus ID, user information D1, and the like to be registered in the management table D10. The user registration request is transmitted by the game apparatus 100 at step S93 of the friend management process, which will be described below with reference to FIG. 17.

If it is determined that a user registration request has been received from a game apparatus 100 (YES at S65), then the CPU 406 performs a user registration process for performing the user registration of the game apparatus 100 that is the source of the user registration request (S66). The user registration process is a process of registering, in the management table D10, an apparatus ID, user information D1, and the like that are contained in the user registration request. After step S66, the CPU 406 ends the server-side communication process. If a user registration request has not been received from any game apparatus 100 (NO at S65), the CPU 406 ends the server-side communication process without performing the above-described step S66.

Described next is a process that is performed when it is determined "YES" at step S42 and "NO" at step S43. If it is determined that power off information associated with the selected game apparatus 100 has been received (YES at S42), or that an online notification has not been received from the selected game apparatus 100 (NO at S43), then the CPU 406 determines the selected game apparatus 100 to be offline (S67). In the present embodiment, if it is determined that an online notification has not been received from the selected game apparatus 100, the game apparatus 100 is immediately determined to be offline. However, as an alternative, the selected game apparatus 100 may be determined to be offline when it is determined that an online notification has not been received from the selected game apparatus 100 for a particular period. Further alternatively, if it is determined that an online notification has not been received from the selected game apparatus 100, the server 400 may request the game apparatus 100 to transmit an online notification to the server 400. Then, only when the server 400 does not receive an online notification from the game apparatus 100 which has received the request, the game apparatus 100 may be determined to be offline. Further alternatively, the server 400 may determine the selected game apparatus 100 to be offline if information indicating a change in the communication connection status of the game apparatus 100 into offline is received from the game apparatus 100.

Next, the CPU 406 refers to the management table D10, thereby determining whether the login determination flag that is associated with the selected apparatus ID is OFF (S68). If it is determined that the login determination flag associated with the selected apparatus ID is OFF (indicating the login state) (YES at S68), the CPU 406 updates, in the management table D10, the login determination flag that is associated with the selected apparatus ID to ON (S69). Thereafter, the CPU 406 updates, in the management table D10, the connection status information that is associated with the selected apparatus ID, to indicate the offline state (S70). Then, the CPU 311 transmits a friend's communication connection status change notification to friend game apparatuses 100 of the selected game apparatus 100 (S71). The friend's communication connection status change notification is transmitted for the purpose of notifying the friend game apparatuses 100 about a change in the connection status information of the selected game apparatus 100 from offline to online. The friend's communication connection status change notification is received by the friend game apparatuses 100 at step S26 of FIG. 13. Thereafter, the CPU 406 advances the processing to the above-described step S59. On the other hand, if it is determined that the login determination flag that is associated with the selected apparatus ID is ON (NO at S68), the CPU 406 advances the processing to the above-described step S64 without performing steps S69 to S71.

Figure 16:
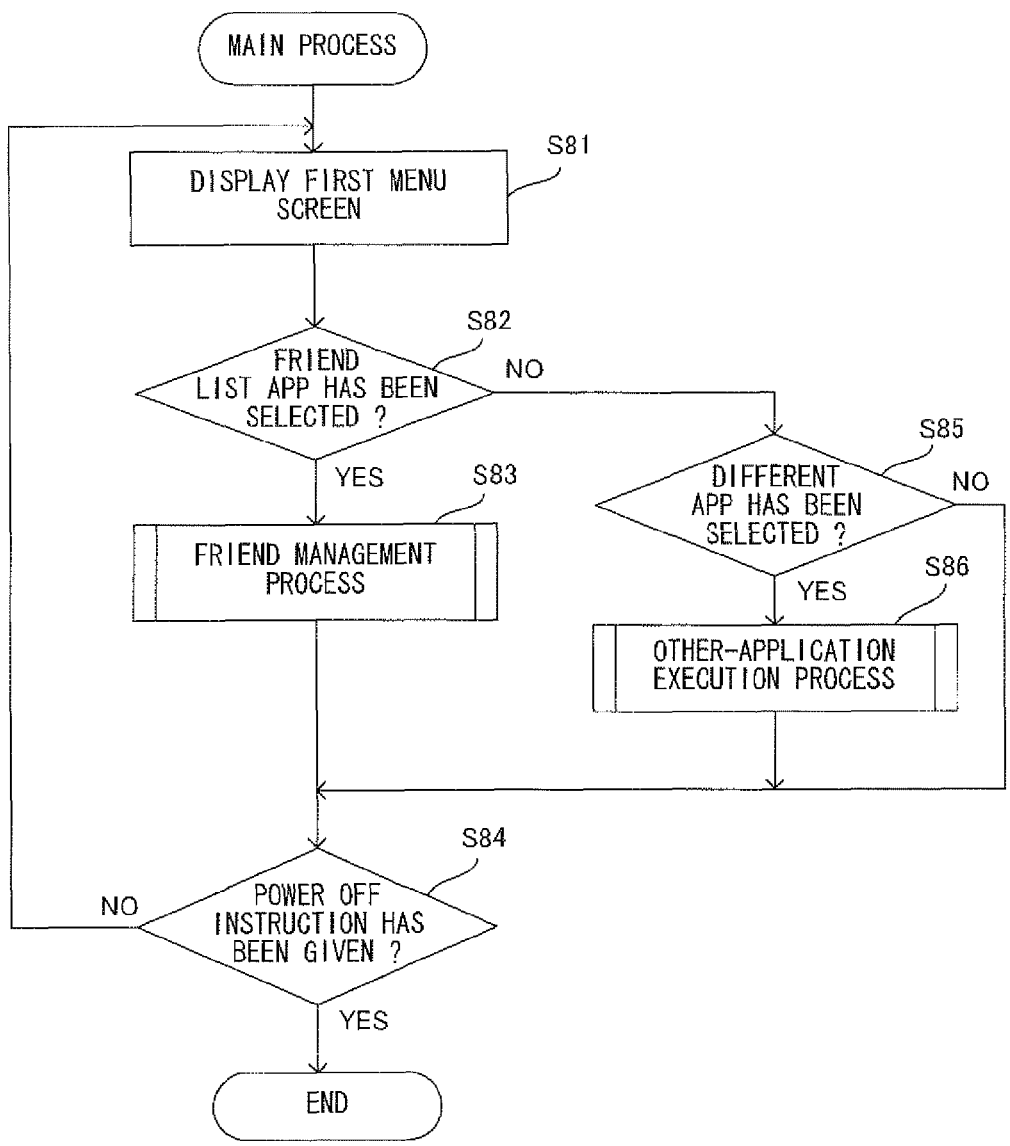
FIG. 16 is a flowchart showing an example of a main process.

Hereinafter, a main process that is performed by the game apparatus 100 (the CPU 311) is described with reference to FIG. 16. In FIG. 16, the term "application" is abbreviated as "APP". The main process starts when the game apparatus 100 is powered on. It should be noted that the main process is performed in parallel with the communication process shown in FIG. 12 by multitasking. FIG. 16 is a flowchart showing an example of the main process.

First, the CPU 311 performs a process for displaying a first menu screen on the lower LCD 12. The first menu screen shows applications that are executable by the game apparatus 100. The first menu screen is a screen for guiding the user to select an application to execute on the game apparatus 100 (S81).

Next, the CPU 311 determines whether the execution of the friend list application P2 has been selected (S82). If it is determined that the execution of the friend list application P2 has been selected (YES at S82), the CPU 311 performs the friend management process (S83). The friend management process will be described in detail below with reference to FIG. 17. Thereafter, the CPU 311 determines whether an instruction to power off the game apparatus 100 has been inputted by the user (S84). If it is determined that an instruction to power off the game apparatus 100 has been inputted by the user (YES at S84), the CPU 311 ends the main process after instructing the power supply circuit 40 to perform a process of powering off the game apparatus 100. If it is determined that an instruction to power off the game apparatus 100 has not been inputted by the user (NO at S84), then the CPU 311 returns the processing to step S81

Described next is a process that is performed when it is determined "NO" at step S82. If it is determined that the execution of the friend list application P2 has not been selected (NO at S82), the CPU 311 determines whether an application different from the friend list application P2 (i.e., another application P3) among the applications that are executable by the game apparatus 100 has been selected (S85). If it is determined that another application P3 has been selected (YES at S85), the CPU 311 performs a process of executing the other application P3 (other-application execution process) (S86). The other-application execution process will be described below in detail with reference FIG. 24. Thereafter, the CPU 311 advances the processing to step S84. If it is determined that another application P3 has not been selected (NO at S85), the CPU 311 advances the processing to step S84 without performing step S86.

Figure 17:
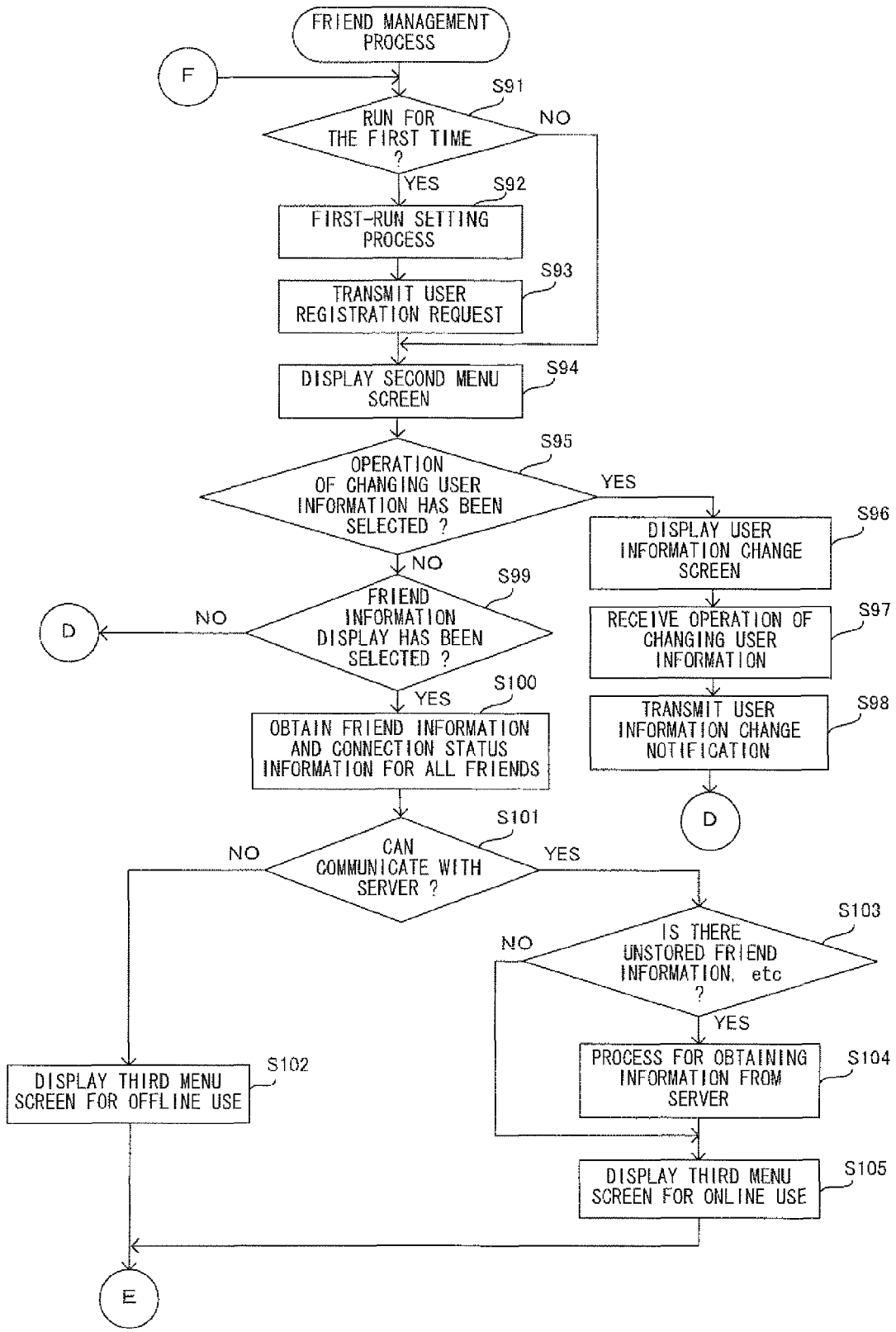
FIG. 17 is a flowchart showing an example of a friend management process.
Figure 18:
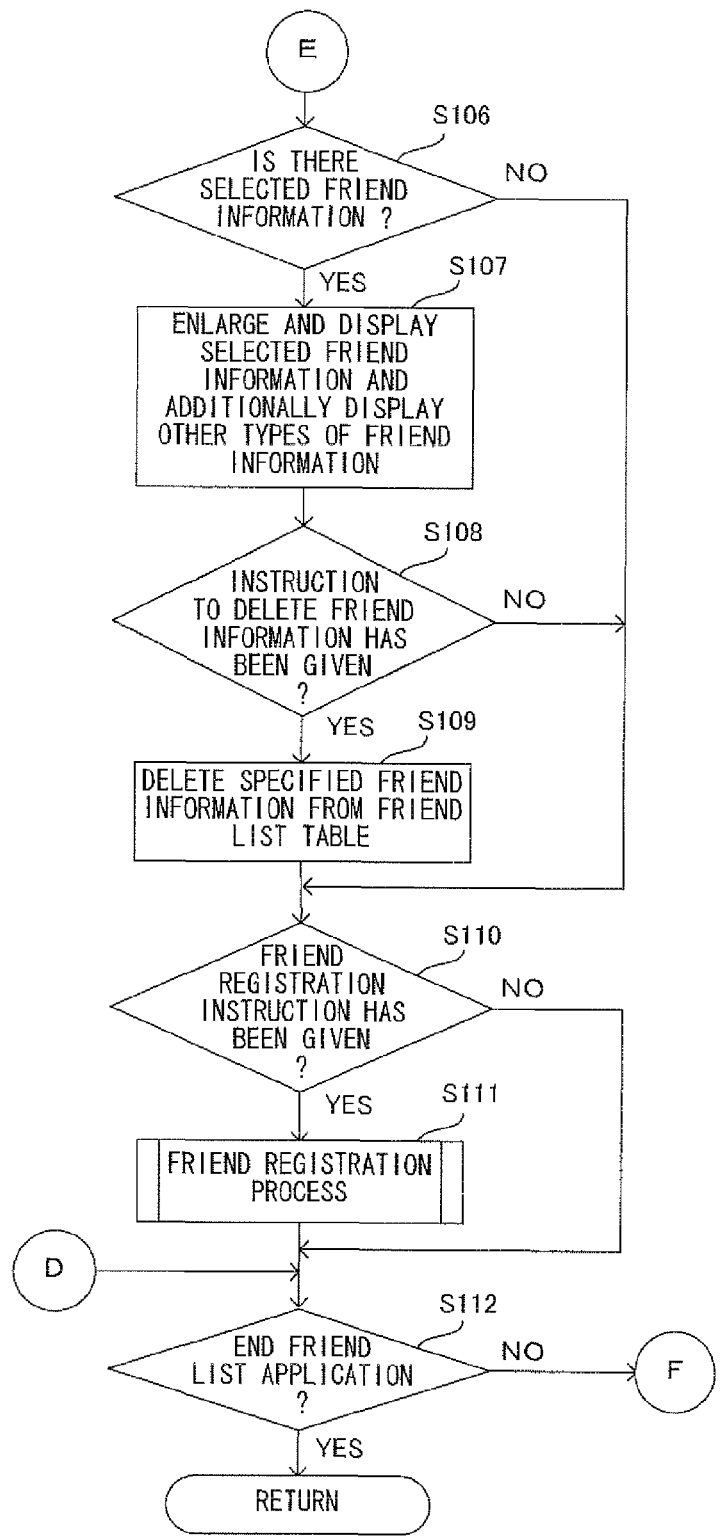
FIG. 18 is a flowchart showing the example of the friend management process.

Hereinafter, the friend management process performed at step S83 is described with reference to FIG. 17 to FIG. 20. FIG. 17 and FIG. 18 are a flowchart showing an example of the friend management process. First, the CPU 311 determines whether the friend list application P2 is run for the first time (S91). If it is determined that the friend list application P2 is run for the first time (YES at S91), the CPU 311 performs a first-run setting process (S92). The first-run setting process is a process of receiving information inputted by the user, which information is used to generate user information D1, and generating the user information D1. For example, in the first-run setting process, a user name inputted by the user is received; character information is generated based on inputs from the user; etc. Moreover, in the first-run setting process, additional settings may be performed regarding, for example, whether to notify the friends about the online state of the game apparatus 100, or whether to notify the friends about the title of an application that the user is currently playing.

Figure 19:
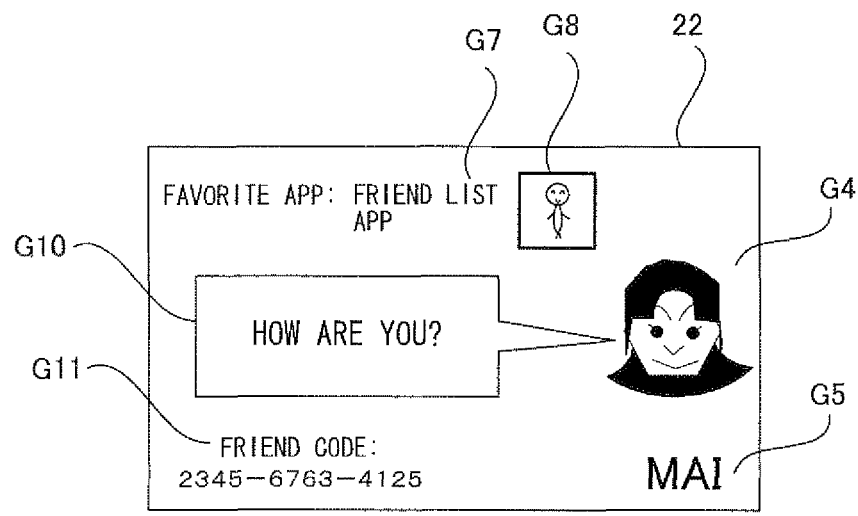
FIG. 19 shows an example of a screen that is displayed in a first-run setting process.

FIG. 19 shows an example of a screen that is displayed in the first-run setting process. The screen is displayed on the upper LCD 22 after all the information for generating the user information D1 has been inputted by the user. The screen is displayed for the purpose of showing the generated user information D1 to the user. The screen displays a character G4 (an image generated based on character information contained in the user information D1), user name G5, favorite application name G7, favorite application icon G8, message G10, and a friend code G11.

Returning to FIG. 17, next, the CPU 311 generates and transmits, to the server 400, a user registration request that contains the user information D1 generated at step S92 and the apparatus ID of the game apparatus 100 (S93). It should be noted that if the game apparatus 100 is currently offline, then the CPU 311 may transmit the user registration request to the server 400 when the game apparatus 100 becomes online. Thereafter, the CPU 311 performs step S94, which will be described below. If it is determined that the friend list application P2 is not run for the first time (NO at S91), the CPU 311 performs step S94, which will be described below, without performing the above-described steps S92 and S93.

Figure 20:
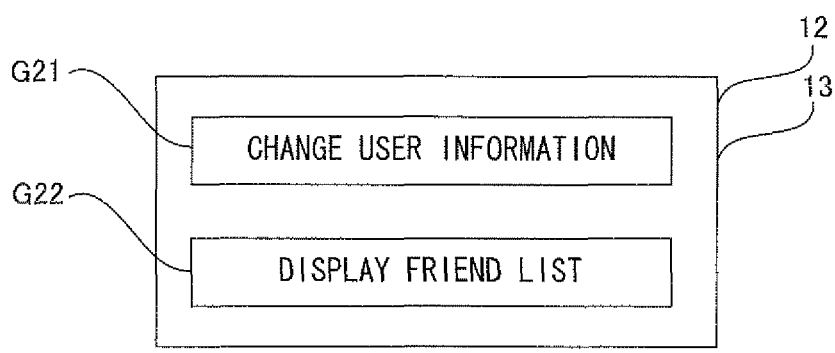
FIG. 20 shows an example of a second menu screen.

At step S94, the CPU 311 performs a process for displaying a second menu screen. FIG. 20 shows an example of the second menu screen. The second menu screen is displayed on the lower LCD 12 and shows an operation button G21 for receiving from the user an operation for changing the user information D1 and an operation button G22 for receiving from the user an instruction to display friend information about friend game apparatuses 100.

Returning to FIG. 17, the CPU 311 determines whether an operation for changing the user information D1 has been received from the user (S95). If it is determined that an operation for changing the user information D1 has been received from the user (YES at S95), the CPU 311 displays a screen for guiding the user to change the user information D1 (S96). Then, the CPU 311 receives from the user an operation of changing the user information D1 and updates the user information D1 stored in the main memory 32 (S97). The CPU 311 generates and transmits, to the server 400, a user information change notification that contains the updated user information D1 (S98). Thereafter, the CPU 311 advances the processing to step S112, which will be described below.

If it is determined that an operation for changing the user information D1 has not been received from the user (NO at S95), the CPU 311 determines whether an instruction to display friend information has been received from the user (S99). If it is determined that an instruction to display friend information has not been received from the user (NO at S99), the CPU 311 advances the processing to step S112, which will be described below.

On the other hand, if it is determined that an instruction to display friend information has been received from the user (YES at S99), the CPU 311 obtains friend information and connection status information from the friend list table D2, regarding all the friend IDs (S100). Then, the CPU 311 determines whether the game apparatus 100 can perform communication with the server 400 (S101). If it is determined that the game apparatus 100 cannot perform communication with the server 400 (NO at S101), the CPU 311 displays a third menu screen for offline use (S102). The third menu screen for offline use shows information, including the friend information and the connection status information that are obtained at step S100. The third menu screen for offline use is displayed on the lower LCD 12 and, for example, is similar to the screen previously described with reference to FIG. 6. In the third menu screen for offline use, texts G6 that are shown on all the respective friend cards G1 indicate the connection status information "OFFLINE". In addition, a message indicating that the game apparatus 100 is offline is displayed on the upper LCD 22 or the lower LCD 12. Thereafter, the CPU 311 advances the processing to step S106, which will be described below.

If it is determined that the game apparatus 100 can perform communication with the server 400 (YES at S101), the CPU 311 refers to the friend list table D2, thereby determining whether there is any friend information unregistered in the friend list table D2 and whether there is any favorite app ID or currently running app ID for which a corresponding application name D6 and icon image D7 are not stored in the main memory 32 (S103). If it is determined "YES" at step S103, the CPU 311 performs a process for obtaining, from the server 400, the friend information that is unregistered in the friend list table D2 and the application name D6 and icon image D7 that are not stored in the main memory 32 (S104). The friend information that is unregistered in the friend list table D2 is as described below, for example. Assume a case where a friend user inputs user information D1. In this case, for example, the friend user may not input a particular type of information such as his/her favorite application name, and the friend user may later input such previously omitted information. If such information inputted later is stored in the management table D10 of the server 400 but not registered in the friend list table D2 of the game apparatus 100, this information is "unregistered friend information". In the process at S104, the game apparatus 100 requests the server 400 to transmit such information (information transmission request). The server 400 determines at step S62 of FIG. 15 whether an information transmission request has been received. The CPU 311 receives information that is transmitted by the server 400 at step S63 of FIG. 15, and stores the received information (e.g., an application name D6 and an icon image D7) in the main memory 32 or updates the friend list table D2 with the received information. Thereafter, the CPU 311 performs step S105, which will be described below. If it is determined "NO" at step S103, the CPU 311 performs step S105, which will be described below, without performing the above-described step S104.

At step S105, the CPU 311 displays a third menu screen for online use. The third menu screen for online use shows the friend information and the connection status information that are obtained at step S100. The third menu screen for online use is displayed on the lower LCD 12 and, for example, is similar to the screen previously described with reference to FIG. 6. If any information has been received from the server 400 at the above-described step S104, the third menu screen is displayed by using the received information.

Then, the CPU 311 determines whether the user has selected one among a plurality of friend cards G1 shown on the third menu screen for online use or the third menu screen for offline use (the third menu screen is, for example, one displayed on the lower LCD 12 as shown in FIG. 6) (S106). The selection of one friend card G1 is performed, for example, in the following manner: when a friend card G1 is displayed at the center of the screen, the user's touch operation of touching the friend card G1 is received by the touch panel 13. In FIG. 6, a friend card G1 of which the friend name is "Satoh" is selected. If it is determined that none of the plurality of friend cards G1 has been selected by the user (NO at S106), the CPU 311 performs step S110, which will be described below. On the other hand, if it is determined that one among the plurality of friend cards G1 has been selected by the user (YES at S106), the CPU 311 performs a process for enlarging the selected friend card G1 and displaying the enlarged friend card G1 on the upper LCD 22 (S107). As one example, the screen on the upper LCD 22 in FIG. 6 shows such an enlarged friend card G1. It should be noted that when the friend card G1 is displayed in such an enlarged manner, the enlarged friend card G1 shows additional friend information (e.g., a friend code G11) that is not shown before the friend card G1 is enlarged.

Next, the CPU 311 determines whether an instruction to delete the selected friend card G1 has been received from the user (S108). The user gives the deletion instruction by performing a touch operation of touching the operation button G2, for example. If it is determined that an instruction to delete the selected friend card G1 has been received from the user (YES at S108), the CPU 311 performs a process of deleting the selected friend card G1 in the display, and also deletes the friend registration (i.e., information registered in the friend list table D2) that is associated with the friend card G1 (S109). Then, the CPU 311 performs step S110, which will be described below. On the other hand, if it is determined that an instruction to delete the selected friend card G1 has not been received from the user (NO at S108), the CPU 311 performs step S110, which will be described below, without performing the above-described step S109. Although not shown in the flowchart, the deletion of the friend card G1 can be performed unlimited number of times. Furthermore, the selection of the friend card G1 may be changed, or the selection of the friend card G1 may be cancelled.

At step S110, the CPU 311 determines whether a friend registration instruction has been received from the user. The user gives the friend registration instruction by performing, for example, a touch operation of touching the operation button G3. If it is determined that a friend registration instruction has been received from the user (YES at S110), the CPU 311 performs a friend registration process for newly adding friend registration (S111). The friend registration process will be described below in detail with reference to FIG. 21 and FIG. 22. Thereafter, the CPU 311 performs step S112, which will be described below. If it is determined that a friend registration instruction has not been received from the user (NO at S110), the CPU 311 performs step S112, which will be described below, without performing step S111.

At step S112, the CPU 311 determines whether an instruction to end the execution of the friend list application P2 has been received from the user. If it is determined that an instruction to end the execution of the friend list application P2 has been received from the user (YES at S112), the CPU 311 ends the friend management process to return to the main process. On the other hand, if it is determined that an instruction to end the execution of the friend list application P2 has not been received from the user (NO at S112), then the CPU 311 returns the processing to step S91.

Figure 21:
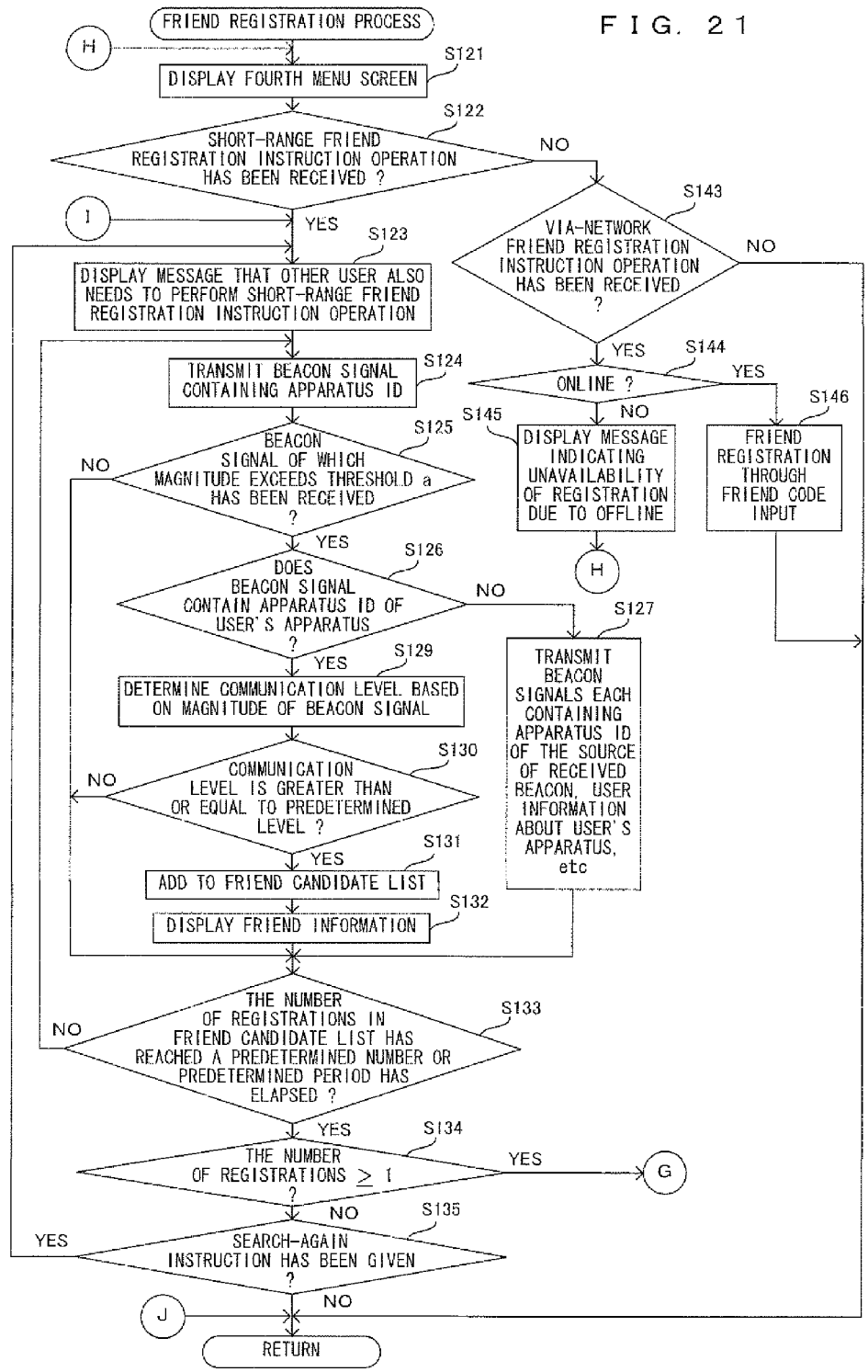
FIG. 21 is a flowchart showing an example of a friend registration process.
Figure 22:
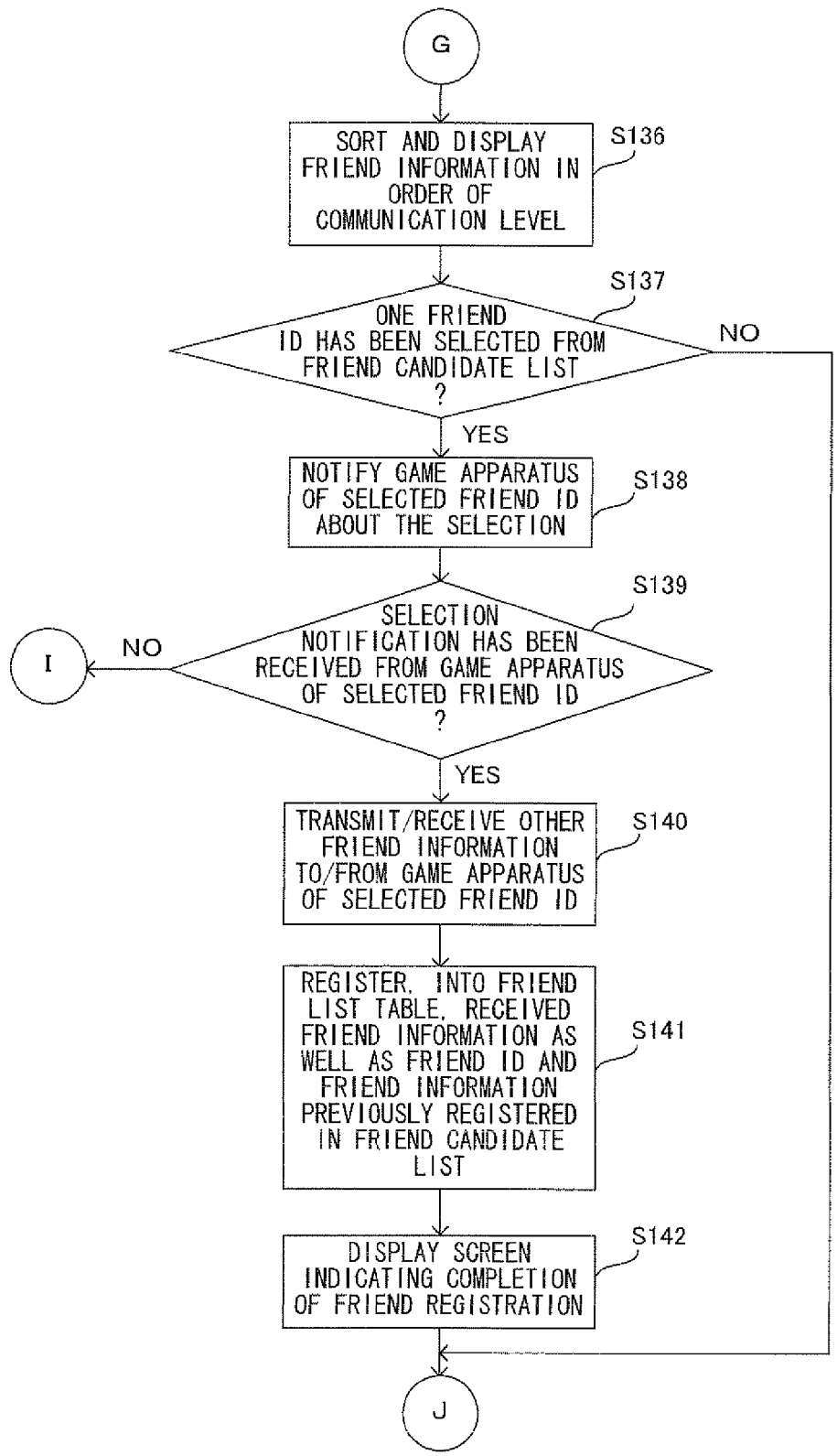
FIG. 22 is a flowchart showing the example of the friend registration process.
Figure 23:
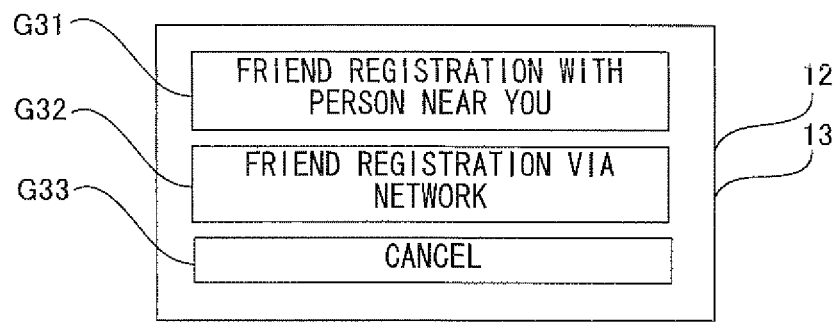
FIG. 23 shows an example of a fourth menu screen.

Hereinafter, the friend registration process performed at step S111 is described with reference to FIG. 7, FIG. 8, and FIG. 21 to FIG. 23. FIG. 21 and FIG. 22 are a flowchart showing an example of the friend registration process. First, the CPU 311 performs a process for displaying a fourth menu screen (S121). The fourth menu screen is displayed for guiding the user to input one of the following instructions: an instruction to the game apparatus 100 to perform friend registration by using the network 300; an instruction to the game apparatus 100 to perform friend registration by using short-range wireless communication; and an instruction to the game apparatus 100 not to perform friend registration. FIG. 23 shows an example of the fourth menu screen. The fourth menu screen shows operation buttons G31 to G33. For example, a touch operation of touching the operation button G31 is an operation of instructing the game apparatus 100 to perform friend registration by using short-range wireless communication (hereinafter, referred to as a "short-range friend registration instruction operation"). As another example, a touch operation of touching the operation button G32 is an operation of instructing the game apparatus 100 to perform friend registration by using the network 300 (hereinafter, referred to as a "via-network friend registration instruction operation". As another further example, a touch operation of touching the operation button G33 is an operation of instructing the game apparatus 100 not to perform friend registration.

Returning to FIG. 21, the CPU 311 determines whether a short-range friend registration instruction operation has been received from the user (S122). If it is determined that a short-range friend registration instruction operation has been received from the user (YES at S122), the CPU 311 displays, for example on the upper LCD 22, a message for informing the user that a request to perform a short-range friend registration instruction operation is also sent to other game apparatuses 100 that are targets of the friend registration (S123). Then, the CPU 311 broadcasts beacon signals each containing the apparatus ID of the game apparatus 100 (S124). It should be noted that if the wireless communication module 36 is currently performing the passing communication or the communication process with the server, the CPU 311 waits for the communication to end, and when the communication has ended, the CPU 311 performs the process at step S124 by using the wireless communication module 36. Alternatively, the CPU 311 may immediately terminate the passing communication or the communication with the server without waiting for the communication to end, and then perform the process at step S124. It should be noted that during a period in which the process steps S124 to S142 (step S142 will be described below) are being performed, the CPU 311 does not perform the communication process shown in FIG. 12. Thereafter, the CPU 311 determines whether a beacon signal, the magnitude of which exceeds a threshold a, has been received from another game apparatus 100 (S125). The threshold a is used as a reference value for making a determination as to whether the magnitude of the received beacon signal is so weak that the beacon signal cannot be used for processing. If a beacon signal that has been received is such an unusable weak signal, the beacon signal is discarded. The wireless communication module 36 obtains only a beacon signal of which the magnitude exceeds the threshold a, and inputs the obtained beacon signal to the CPU 311. As described below, the threshold a may also be used as a threshold for determining whether a signal magnitude required for executing an application that uses short-range wireless communication is satisfied.

If it is determined that a beacon signal, the magnitude of which exceeds the threshold a, has not been received from any game apparatuses 100 (NO at S125), the CPU 311 advances the processing to step S133, which will be described below. On the other hand, if it is determined that a beacon signal, the magnitude of which exceeds the threshold a, has been received from another game apparatus 100 (YES at S125), the CPU 311 determines whether the received beacon signal contains the apparatus ID of the game apparatus 100 (S126). If the received beacon signal contains the apparatus ID of the game apparatus 100, this means that the received beacon signal is a beacon signal that the other game apparatus 100 has transmitted in response to receiving the beacon signal that the game apparatus 100 has transmitted at step S124. Accordingly, if it is determined "YES" at step S126, then it is likely that the game apparatus 100 and the other game apparatus 100 are able to communicate with each other by short-range wireless communication.

If it is determined that the received beacon signal does not contain the apparatus ID of the game apparatus 100 (NO at S126), the CPU 311 discards the received beacon and broadcasts beacon signals, each of which contains: the apparatus ID of the other game apparatus 100 that is the source of the received beacon; the apparatus ID of the game apparatus 100; and a part of the user information D1 about the game apparatus 100 (e.g., the user name and character information) (S127). The reason for discarding the received beacon is that the received beacon is not a beacon signal that the other game apparatus 100 has transmitted in response to receiving the beacon signal that the game apparatus 100 has transmitted at step S124. Thereafter, the CPU 311 advances the processing to step S133, which will be described below.

If it is determined that the received beacon signal contains the apparatus ID of the game apparatus 100 (YES at S126), this means that the other game apparatus 100 has transmitted the beacon signal in response to receiving the beacon signal that the game apparatus 100 has transmitted at step S124. In this case, the CPU 311 searches the communication level table D4 (see FIG. 10C) based on the magnitude (dBm) of the received beacon signal, and then determines a communication level that corresponds to the magnitude (dBm) of the received beacon signal (S129).

Then, the CPU 311 determines whether the communication level determined at step S129 is greater than or equal to a predetermined level (e.g., communication level L2) (S130). It should be noted that the setting of the predetermined level may be manually changed by the user. In the present embodiment, the communication level is determined based on the signal magnitude, and the communication level is used to determine whether the signal magnitude satisfies the communication status condition. However, as an alternative, without using the communication level, the signal magnitude (dBm) may be directly used to determine whether the signal magnitude satisfies the communication status condition (e.g., determine whether the signal magnitude exceeds a threshold b (threshold b>threshold a)). If it is determined that the communication level is not greater than or equal to the predetermined level (NO at S130), then the CPU 311 advances the processing to step S133, which will be described below. On the other hand, if it is determined that the communication level is greater than or equal to the predetermined level (YES at S130), the CPU 311 registers the apparatus ID and user information D1 (the user name and character information) of the other game apparatus, which are contained in the received beacon, as a friend ID and friend information in the friend candidate list table D3 (see FIG. 10B) (here, the user name is registered as a friend name) (S131). Then, the CPU 311 performs a process for displaying the registered friend information (S132). A screen displayed at step S132 is, for example, one as shown in FIG. 7. The screen as shown in FIG. 7 is displayed on the lower LCD 12 as described above. In this screen, a friend card G1 is displayed. On the friend card G1, the friend information about the user of the other game apparatus (a character G4 based on the character information and a user name G5) is shown.

Then, the CPU 311 determines whether one of the following conditions has been satisfied: the number of apparatus IDs registered in the friend candidate list table D3 has reached a predetermined number (e.g., 3); and a predetermined period has elapsed after it is determined "YES" at step S122 (S133). It should be noted that the CPU 311 activates the timer when it is determined "YES" at step S122. This allows the CPU 311 to determine whether the predetermined period has elapsed. If it is determined "NO" at step S133, the CPU 311 returns the processing to step S124 and repeats the above-described process steps S124 to S132 until it is determined "YES" at step S133. It should be noted that each time an apparatus ID is newly registered in the friend candidate list table D3, the screen displayed at step S132 shows an additional friend card G1 to display the friend information that is associated with the newly registered apparatus ID.

If it is determined "YES" at step S133, the CPU 311 determines whether the number of registered friend IDs in the friend candidate list table D3 is greater than or equal to 1 (S134). If it is determined that the number of registered friend IDs in the friend candidate list table D3 is not greater than or equal to 1 (NO at S134), this means that no game apparatus as a friend candidate has been found. Accordingly, the CPU 311 performs a process of displaying a screen that prompts the user to give an instruction to search again (search-again instruction) for another game apparatus 100 to be a friend candidate (i.e., a game apparatus of which the friend ID is to be registered in the friend candidate list table D3). Thereafter, the CPU 311 determines whether a search-again instruction has been received (S135). If it is determined that a search-again instruction has not been received (NO at S135), the CPU 311 ends the friend registration process and returns to the friend management process. On the other hand, if it is determined that a search-again instruction has been received (YES at S135), the CPU 311 returns the processing to step S123 and then searches again for another game apparatus 100 to be a friend candidate (i.e., performs the process steps S123 to S134).

Described next is a process that is performed when it is determined "YES" at step S134. If it is determined that the number of registered apparatus IDs in the friend candidate list table D3 is greater than or equal to 1 (YES at S134), the CPU 311 sorts and displays pieces of friend information (friend cards G1) in order of communication level (S136). It should be noted that the friend cards G1 may be displayed in order of beacon reception, without performing step S136. Next, the CPU 311 determines whether an operation of selecting one among the friend IDs registered in the friend candidate list table D3 (an operation of selecting one among the displayed friend cards G1) has been received from the user (S137). The operation of selecting one friend ID is performed, for example, by tapping on one friend card G1 shown in the screen as in FIG. 7.

If it is determined that an operation of selecting one friend ID has not been received from the user (NO at S137), the CPU 311 ends the friend registration process and returns to the friend management process. On the other hand, if it is determined that an operation of selecting one friend ID has been received from the user (YES at S137), the CPU 311 transmits, to the game apparatus 100 of the selected friend ID, a notification that the game apparatus 100 has been selected (i.e., a selection notification) (S138). The game apparatus 100 of the selected friend ID is notified of its friend ID being selected, through the reception of the selection notification. Next, the CPU 311 determines whether a selection notification has been received from the game apparatus 100 of the selected friend ID (S139). If it is determined that a selection notification has not been received from the game apparatus 100 of the selected friend ID (NO at S139), the CPU 311 returns the processing to step S123 without performing registration into the friend list table D2, and searches again for another game apparatus 100 to be a friend candidate (i.e., performs the process steps S123 to S138).

On the other hand, if it is determined that a selection notification has been received from the game apparatus 100 of the selected friend ID (YES at S139), the CPU 311 transmits to and receives from the game apparatus 100 of the selected friend ID, friend information other than the friend information previously obtained at step S131 (e.g., a friend code, favorite app ID, currently running app ID, and a message that are contained in user information D1) (S140). Then, in the friend list table D2, the CPU 311 registers the friend information received at step S140 as well as the friend ID and friend information (e.g., the user name and character information) previously registered in the friend candidate list table D3 at step S131, such that they are associated with each other in the friend list table D2 (S141). Next, the CPU 311 deletes the registered information in the friend candidate list table D3. Thereafter, the CPU 311 displays a screen that indicates the completion of the friend registration (S142). The screen displayed at step S142 is one as shown in FIG. 8, for example. Then, the CPU 311 ends the friend registration process and returns to the friend management process. It should be noted that after performing step S142, the CPU may return the processing to step S137, thereby allowing the user to select again a friend candidate to register from among the remaining friend candidates.

Hereinafter, a process that is performed when it is determined "NO" at step S122 is described. The CPU 311 determines whether a via-network friend registration instruction operation has been received (S143). If it is determined that a via-network friend registration instruction operation has been received (YES at S143), then the CPU 311 determines whether the game apparatus 100 is currently online (S144). If it is determined that the game apparatus 100 is currently online (YES at S144), the CPU 311 performs friend registration in response to the user inputting a friend code (i.e., registration into the friend list table D2). If it is determined that the game apparatus 100 is not currently online (NO at S144), the CPU 311 displays a message indicating that the via-network friend registration is unavailable due to the offline state (S145), and returns the processing to step S121. If it is determined that the game apparatus 100 is online (YES at S144), the CPU 311 displays a friend code input screen for receiving an input of the friend code of another game apparatus 100. The inputted friend code is transmitted to the server 400. Upon receiving from the server 400 the friend ID and friend information that are associated with the friend code, the game apparatus 100 registers the friend ID and friend information in the friend list table D2 (S146). Thereafter, the CPU 311 ends the friend registration process and returns to the friend management process. If it is determined that a via-network friend registration instruction operation has not been received (NO at S143), this means that the CPU 311 has received an operation of instructing the CPU 311 not to perform friend registration. In this case, the CPU 311 ends the friend registration process and returns to the friend management process.

Figure 24:
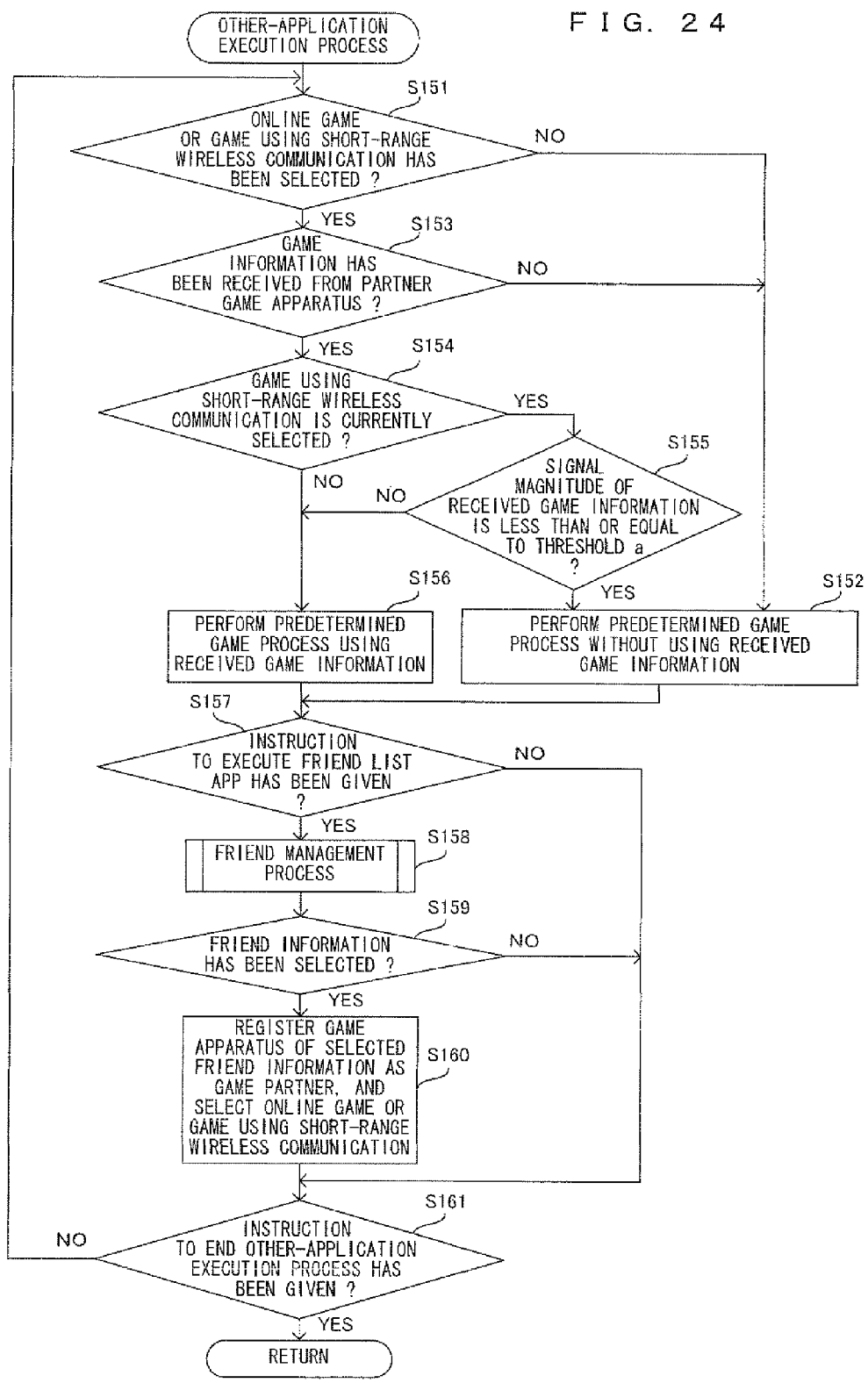
FIG. 24 is a flowchart showing an example of an other-application execution process.

Hereinafter, the other-application execution process performed at step S86 is described with reference to FIG. 24. FIG. 24 is a flowchart showing an example of the other-application execution process. First, the CPU 311 determines whether an online game (i.e., an online game via the network 300) or a game using short-range wireless communication has been selected (S151). If it is determined that an online game or a game using short-range wireless communication has not been selected (NO at S151), the CPU 311 performs a predetermined game process (including, for example, a process for changing the position of a player character in a virtual three-dimensional space based on an operation by the user, and a process for rendering the virtual three-dimensional space) (S152). It should be noted that step S152 is performed when the user plays a game offline. Therefore, at step S152, the game apparatus 100 performs the predetermined game process based solely on game information (i.e., information required for executing the game processes) stored therein. Thereafter, the CPU 311 performs step S157, which will be described below.

If it is determined that an online game or a game using short-range wireless communication has been selected (YES at S151), the CPU 311 determines whether game information has been received from a partner game apparatus 100 to play the game with (S153). If it is determined that game information has not been received from the partner game apparatus 100 to play the game with (NO at S153), the CPU 311 performs the process at step S152 (i.e., the predetermined game process based solely on game information stored in the game apparatus 100). Thereafter, the CPU 311 performs step S157, which will be described below. On the other hand, if it is determined that game information has been received from the partner game apparatus 100 to play the game with (YES at S153), the CPU 311 determines whether a game using short-range wireless communication is currently selected (S154). If a game using short-range wireless communication is not selected, that is, if an online game is currently selected (NO at S154), the CPU 311 performs a predetermined game process by using received game information. On the other hand, if it is determined that a game using short-range wireless communication is currently selected (YES at S154), the CPU 311 measures the signal magnitude (dBm) of the received game information to determine whether the measured signal magnitude (dBm) is less than or equal to the threshold a (S155). Although in the present embodiment the signal magnitude (dBm) of the game information is measured, any other information may be measured instead so long as the measured information indicates a communication level between the game apparatus and another information processing apparatus (e.g., a beacon signal magnitude).

If it is determined that the measured signal magnitude (dBm) is less than or equal to the threshold a (YES at S155), the CPU 311 discards the received game information and performs the process at step S152 (i.e., the predetermined game process based solely on game information stored in the game apparatus 100). Thereafter, the CPU 311 performs step S157, which will be described below. On the other hand, if it is determined that the measured signal magnitude (dBm) is not less than or equal to the threshold a (NO at S155), the CPU 311 uses the received game information to perform a predetermined game process (S156).

Then, the CPU 311 determines whether an instruction to execute the friend list application P2 has been received (S157). It should be noted that in the present embodiment, the friend list application P2 can be started even if the other-application execution process is being performed. If it is determined that an instruction to execute the friend list application P2 has been received (YES at S157), the CPU 311 performs the friend management process as previously described with reference to FIG. 17 to FIG. 20 (S158). Then, the CPU 311 determines whether the user has selected one among a plurality of friend cards G1 in the friend management process (S159).

If it is determined that the user has selected one among a plurality of friend cards G1 (YES at S159), the CPU 311 registers the game apparatus 100 that is associated with the selected friend card G1, in the main memory 32 as a partner to play a game with. Further, the CPU 311 selectively sets the online game or the game using short-range wireless communication (S160). Which one of the online game and the game using short-range wireless communication is to be set is determined based on a selection operation by the user. It should be noted that there are cases where identification information such as IP addresses are necessary if game apparatuses 100 communicate with each other via the network 300 and the server 400. In such a case, at step S160, the game apparatus 100 and the other game apparatus 100 notify each other of their IP addresses or the like. Then, the CPU 311 determines whether an instruction to end the other-application execution process has been received from the user (S161). If it is determined that an instruction to end the other-application execution process has been received from the user (YES at S161), the CPU 311 ends the other-application execution process. On the other hand, if it is determined that an instruction to end the other-application execution process has not been received from the user (NO at S161), the CPU 311 returns the processing to step S151.

Described next is a process that is performed when it is determined that an instruction to execute the friend list application P2 has not been received (NO at S157) or when it is determined that the user has not selected one among a plurality of friend cards G1 (NO at S159). In these cases, the CPU 311 performs the process at step S161 without performing the process steps S158 to S160. If it is determined at step S161 that an instruction to end the other-application execution process has not been received from the user (NO at S161), the CPU 311 returns the processing to step S151. On the other hand, if it is determined that an instruction to end the other-application execution process has been received from the user (YES at S161), the CPU 311 ends the other-application execution process.

As described above, the communication system 1 according to the present embodiment has the first feature that the game apparatus 100 registers, as a friend, an apparatus ID received from another game apparatus 100 only when the short-range wireless communication with the other game apparatus 100 satisfies a communication status condition (for example, the communication status condition is that a communication level deter pined based on the magnitude of a received beacon signal is greater than a predetermined level). Accordingly, for example, if being located within a certain distance range from the game apparatus 100 is set as the communication status condition, then targets for the friend registration can be limited to information processing apparatuses that are located within the certain distance range from the game apparatus 100. This effectively prevents a situation where another game apparatus 100 that the user of the game apparatus 100 does not wish to register as a friend is erroneously registered as a friend of the game apparatus 100. Thus, the user can accurately register, in the user's game apparatus 100, a desired game apparatus 100 as a friend.

The communication system 1 according to the present embodiment has the second feature that the game apparatus 100 automatically searches for and connects to an access point 200 which the game apparatus 100 can communicate with, and that the game apparatus 100 receives communication status information (e.g., information indicating online or offline) about its friend game apparatus 100 from the server 400 via the access point 200. Since each game apparatus 100 is a handheld apparatus which connects to an access point 200 by wireless communication, the communication connection status of the game apparatus 100 frequently changes between the online state and the offline state. Owing to the second feature of the present embodiment, the game apparatus 100 obtains the communication connection status of its friend game apparatus 100 from the server 400 each time the game apparatus 100 connects to an access point 200. This allows the game apparatus 100 to promptly obtain a change in the communication connection status of its friend game apparatus 100.

Hereinafter, variations of the present embodiment are described.

(1) In the present embodiment, another application P3 is a game application to perform game processing. However, the present invention is not limited thereto. Another application P3 may be a different type of application. For example, another application P3 may be an application for allowing the user of the game apparatus 100 to make a phone call to, or to chat with, the user of another game apparatus 100. In such a case, communication for a phone call or chatting is performed only between game apparatuses 100 that register each other as friends.

(2) In the present embodiment, friend registration is performed only when the user has selected a friend candidate in the friend registration process (steps S137 to S141). However, the present invention is not limited thereto. For example, if there are game apparatuses 100 of which the communication level is determined at step S130 to be a predetermined level or higher, then all of these game apparatuses 100 may automatically be registered as friends.

(3) Although in the present embodiment the present invention is applied to game apparatuses 100, the present invention is applicable not only to game apparatuses but also to, for example, portable information terminal apparatuses such as mobile phones, personal handyphone systems (PHS), or personal digital assistants (PDA).

(4) In the present embodiment, the server-side communication process is performed by a single server 400. However, the server-side communication process may be performed by a plurality of servers in a distributed manner.

While the invention has been described in detail, the foregoing description is in all aspects illustrative and not restrictive. It will be understood that numerous other modifications and variations can be devised without departing from the scope of the invention.

What is claimed is:

1. A communication system including a plurality of information processing apparatuses,
    each information processing apparatus comprising:
        a first communicator for performing short-range wireless communication with another information processing apparatus among the plurality of information processing apparatuses;
        a receiver for receiving, by using the first communicator, other-apparatus identification information which is identification information of the other information processing apparatus, from the other information processing apparatus;
        a communication status detector for detecting, by using the first communicator, a communication status of the short-range wireless communication with the other information processing apparatus;
        a registration/non-registration determination unit for determining, based on a result of the detection by the communication status detector, whether or not to register the other information processing apparatus which is associated with the other-apparatus identification information received by the receiver; and
        a first registration unit for registering the other information processing apparatus when the registration/non-registration determination unit has determined to register the other information processing apparatus,
    each information processing apparatus performing communication with the other information processing apparatus based on the registration by the first registration unit.

2. The communication system according to claim 1, wherein the communication status includes a signal magnitude of a signal that is received by the first communicator from the other information processing apparatus.

3. The communication system according to claim 2, wherein the registration/non-registration determination unit determines the other information processing apparatus to be a registration target if the communication status with the other information processing apparatus, which is detected by the communication status detector, indicates that the signal magnitude exceeds a second threshold.

4. The communication system according to claim 3, wherein
    the second threshold is a value greater than a first threshold, and
    the short-range wireless communication using the first communicator is performable between the information processing apparatus and the other information processing apparatus when the signal magnitude exceeds the first threshold.

5. The communication system according to claim 4, wherein
    a communication module for the first communicator obtains, from the other information processing apparatus, data of which signal magnitude exceeds the first threshold, and
    the registration/non-registration determination unit determines the other information processing apparatus to be a registration target if the signal magnitude of the data obtained by the communication module exceeds the second threshold which is greater than a predetermined level.

6. The communication system according to claim 3, wherein each information processing apparatus further comprises an information processor for performing, by using the first communicator, communication with the other information processing apparatus for predetermined information processing, the information processor executes the predetermined information processing by using data which is received from the other information processing apparatus and of which signal magnitude is at a predetermined level or greater, and the registration/non-registration determination unit determines the other information processing apparatus to be a registration target if the signal magnitude exceeds the second threshold which is greater than a predetermined level.

7. The communication system according to claim 3, wherein each information processing apparatus further comprises an application executor for executing a predetermined application, through execution of the application, the receiver obtains application processing data from the other information processing apparatus by using the first communicator, the first communicator performs a communication process using the application processing data if the communication status detected by the communication status detector indicates that the signal magnitude exceeds a first threshold.

8. The communication system according to claim 2, wherein the communication status includes one of multiple communication levels which are defined in relation to the signal magnitude.

9. The communication system according to claim 1, wherein the receiver is configured to receive a plurality of pieces of other-apparatus identification information from other respective information processing apparatuses among the plurality of information processing apparatuses, and the registration/non-registration determination unit determines, based on communication statuses which the communication status detector detects between the information processing apparatus and the other respective information processing apparatuses, whether or not to register the other information processing apparatuses which are associated with the respective pieces of other-apparatus identification information.

10. The communication system according to claim 9, wherein each information processing apparatus further comprises an input for receiving a selection from a user, and the registration/non-registration determination unit determines to register, among the other information processing apparatuses associated with the respective pieces of other-apparatus identification information, one other information processing apparatus of which the communication status satisfies a predetermined condition and which is specified by the selection received by the input.

11. The communication system according to claim 10, wherein each information processing apparatus further comprises a display, the display displays associated information which is associated with, among the other information processing apparatuses, information processing apparatuses of which the communication status satisfies the predetermined condition, and the registration/non-registration determination unit determines to register, among the information processing apparatuses of which the associated information is displayed, an information processing apparatus that is specified by the selection received by the input.

12. The communication system according to claim 11, wherein the receiver uses the first communicator to receive, in addition to the other-apparatus identification information, user information which indicates characteristics of users of the other respective information processing apparatuses.

13. The communication system according to claim 12, wherein the display displays, as the associated information, the user information that is associated with, among the other information processing apparatuses, information processing apparatuses of which the communication status satisfies the predetermined condition.

14. The communication system according to claim 12, wherein the receiver receives, as the user information, character information associated with the users of the other respective information processing apparatuses.

15. The communication system according to claim 10, wherein the registration/non-registration determination unit determines to register the one other information processing apparatus if:

the registration/non-registration determination unit has used, when the user has selected the one other information processing apparatus by using the input, the first communicator to transmit to the one other information processing apparatus a selection notification that notifies the one other information processing apparatus about the selection; and the first communicator has received from the one other information processing apparatus a selection notification that notifies the information processing apparatus that the information processing apparatus has been selected at the one other information processing apparatus's end.

16. The communication system according to claim 1, wherein the receiver performs a receiving process for receiving the other-apparatus identification information, and when a predetermined period has elapsed after the receiving process is started or when a predetermined number of pieces of other-apparatus identification information have been received, ends the receiving process.

17. The communication system according to claim 1, wherein each information processing apparatus further comprises transmitter for broadcasting, by using the first communicator, request information for requesting to transmit the other-apparatus identification information, and when the receiver has received, by using the first communicator, response information which the other information processing apparatus transmits in response to the request information, the receiver obtains from the response information the other-apparatus identification information that is associated with the other information processing apparatus.

18. The communication system according to claim 1, further comprising a server, wherein the server comprises:

a server communicator for performing communication with the plurality of information processing apparatuses;

a second registration unit for storing, for each information processing apparatus, registration information indicating the other information processing apparatus which the information processing apparatus has registered by using the first registration unit, such that the registration information is associated with the information processing apparatus; and an update unit for updating, when the server communicator has received the registration information from any of the information processing apparatuses, information stored in the second registration unit by using the received registration information, and each information processing apparatus uses second communicator to transmit, to the server, the registration information which the information processing apparatus has registered by using the first registration unit and which indicates the other information processing apparatus.

19. An information processing apparatus comprising:
a computer system, comprising at least one computer processor, the computer system being configured to enable operation comprising:
  a first communication for performing short-range wireless communication with another information processing apparatus among the plurality of information processing apparatuses;
  a reception for receiving, by using the first communication, other-apparatus identification information which is identification information of the other information processing apparatus, from the other information processing apparatus;
  a communication status detection for detecting, by using the first communication, a communication status of the short-range wireless communication with the other information processing apparatus;
  a registration/non-registration determination for determining, based on a result of the detection by the communication status detection, whether or not to register the other information processing apparatus which is associated with the other-apparatus identification information received by the reception; and
  a first registration for registering the other information processing apparatus when the registration/non-registration determination has determined to register the other information processing apparatus,
  a performance of communication with the other information processing apparatus which is registered by the first registration.

20. A non-transitory computer-readable storage medium having stored therein a program for causing a computer of an information processing apparatus to provide operation comprising:
  a first communication for performing short-range wireless communication with another information processing apparatus among the plurality of information processing apparatuses;
  a reception for receiving, by using the first communication, other-apparatus identification information which is identification information of the other information processing apparatus, from the other information processing apparatus;
  a communication status detection for detecting, by using the first communication, a communication status of the short-range wireless communication with the other information processing apparatus;
  a registration/non-registration determination for determining, based on a result of the detection by the communication status detection, whether or not to register the other information processing apparatus which is associated with the other-apparatus identification information received by the reception; and
  a first registration for registering the other information processing apparatus when the registration/non-registration determination has determined to register the other information processing apparatus,
  a performance of communication with the other information processing apparatus which is registered by the first registration.

21. An information processing method using an information processing apparatus which includes a first communication device for performing short-range wireless communication with another information processing apparatus, the information processing method comprising:
  a receiving step of receiving, by performing the short-range wireless communication using the first communication device, other-apparatus identification information which is identification information of the other information processing apparatus, from the other information processing apparatus;
  a communication status detection step of detecting a communication status of the short-range wireless communication with the other information processing apparatus;
  a registration/non-registration determination step of determining, using at least one computer processor and based on a result of the detection in the communication status detection step, whether or not to register the other information processing apparatus which is associated with the other-apparatus identification information received in the receiving step;
  a registration step of registering the other information processing apparatus when it is determined in the registration/non-registration determination step to register the other information processing apparatus; and
  a communication step of performing communication with the other information processing apparatus which is registered in the first registration step.

* * * * *